United States Patent
Macy et al.

(10) Patent No.: US 12,039,517 B1
(45) Date of Patent: Jul. 16, 2024

(54) MITIGATING NEAR-FIELD-COMMUNICATION (NFC) ANTENNA INTERFERENCE

(71) Applicant: Amazon Technologies, Inc., Seattle, WA (US)

(72) Inventors: Benjamin Blake Macy, Seattle, WA (US); Sora Kim, Seattle, WA (US); Kaustuva Acharya, Sammamish, WA (US); Jacob Francis Garstki, Puyallup, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/132,894

(22) Filed: Apr. 10, 2023

Related U.S. Application Data

(62) Division of application No. 16/859,659, filed on Apr. 27, 2020, now Pat. No. 11,625,707.

(51) Int. Cl.
  *G06Q 20/32* (2012.01)
  *H04B 5/48* (2024.01)

(52) U.S. Cl.
  CPC .......... *G06Q 20/3278* (2013.01); *H04B 5/48* (2024.01)

(58) Field of Classification Search
  CPC ..... G06Q 40/00; G06Q 20/00; G06Q 20/3274
  See application file for complete search history.

(56) References Cited

U.S. PATENT DOCUMENTS

| | | | | |
|---|---|---|---|---|
| 8,225,997 | B1* | 7/2012 | Bierbaum | G06Q 20/3278 235/382 |
| 8,905,317 | B1* | 12/2014 | Hsu | H01Q 1/2225 235/487 |
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 11,182,770 | B1* | 11/2021 | Yan | H04B 5/02 |
| 2006/0129485 | A1* | 6/2006 | Hamzy | G06Q 20/102 705/40 |
| 2007/0291995 | A1* | 12/2007 | Rivera | G06F 21/32 382/115 |
| 2008/0136595 | A1* | 6/2008 | Finkenzeller | G06K 7/10336 340/10.1 |
| 2008/0238625 | A1* | 10/2008 | Rofougaran | H04B 5/0012 340/10.1 |
| 2010/0190436 | A1* | 7/2010 | Cook | H04B 5/00 455/41.1 |

(Continued)

OTHER PUBLICATIONS

Office Action for U.S. Appl. No. 16/859,659, dated Aug. 18, 2022, Macy, "Mitigating Near-Field-Communication (NFC) Antenna Interference", 8 pages.

*Primary Examiner* — Kirsten S Apple
(74) *Attorney, Agent, or Firm* — Lee & Hayes, P.C.

(57) ABSTRACT

This disclosure describes systems and techniques for enabling a communication device to communicate wirelessly with a near-field-communication (NFC)-enabled payment terminal while avoiding interference between the NFC-enabled payment terminal and other NFC payment instruments. In some instances, the communication device may receive, via a non-NFC communication protocol, a payment token from an identification device and may send, over NFC, the payment token to the NFC-enabled payment terminal for satisfying the cost of a transaction.

20 Claims, 12 Drawing Sheets

(56) References Cited

U.S. PATENT DOCUMENTS

| | | | |
|---|---|---|---|
| 2010/0201313 A1* | 8/2010 | Vorenkamp | H01M 10/46 320/108 |
| 2010/0222021 A1* | 9/2010 | Balsan | H04W 4/24 455/406 |
| 2010/0271177 A1* | 10/2010 | Pang | H04W 4/80 340/10.1 |
| 2010/0271196 A1* | 10/2010 | Schmitt | G08G 1/052 340/466 |
| 2010/0279606 A1* | 11/2010 | Hillan | H04B 5/00 455/41.1 |
| 2011/0019824 A1* | 1/2011 | Sattiraju | H04L 63/0428 380/270 |
| 2011/0106698 A1* | 5/2011 | Isaacson | G06Q 30/02 705/41 |
| 2012/0150643 A1* | 6/2012 | Wolfe | G06Q 20/34 705/41 |
| 2012/0309308 A1* | 12/2012 | Kim | H02J 50/12 455/41.1 |
| 2013/0284806 A1 | 10/2013 | Margalit | |
| 2014/0080409 A1* | 3/2014 | Frankland | H04B 17/104 455/41.1 |
| 2014/0086301 A1* | 3/2014 | Akhavan | H04L 25/03828 375/238 |
| 2014/0368053 A1* | 12/2014 | Lee | H02J 7/00047 307/104 |
| 2016/0249157 A1* | 8/2016 | Fine | H01Q 1/248 |
| 2017/0180010 A1* | 6/2017 | Michel | G06K 7/10009 |
| 2017/0201008 A1* | 7/2017 | Wu | H01Q 1/36 |
| 2018/0123645 A1* | 5/2018 | Jang | G06F 21/44 |
| 2020/0091608 A1* | 3/2020 | Alpman | H01Q 1/2283 |
| 2021/0337369 A1* | 10/2021 | Schneider | H04B 5/0031 |

* cited by examiner

MITIGATING NEAR-FIELD-COMMUNICATION (NFC) ANTENNA INTERFERENCE

RELATED APPLICATIONS

This application claims priority to and is a divisional of U.S. patent application Ser. No. 16/859,659, filed on Apr. 27, 2020, the entire contents of which are incorporated herein by reference.

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
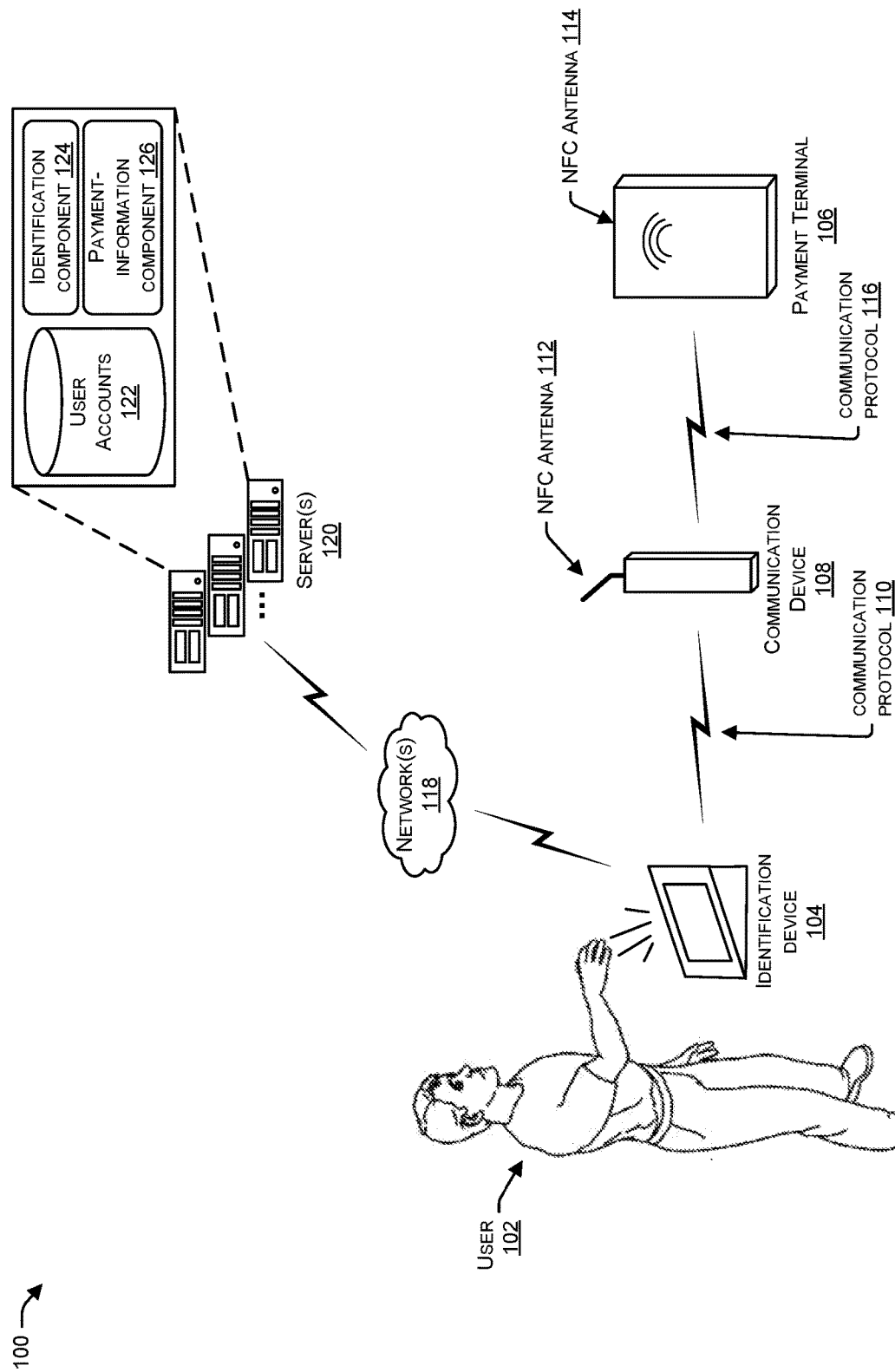
FIG. 1 illustrates an example environment that includes a payment terminal that is configured to accept payment for a transaction via a near-field-communication (NFC) payment instrument, as well as via a payment token received from an identification device via a communication device that communications with the payment terminal over NFC. In some instances, the communication device includes an NFC antenna that may interfere with an NFC antenna of the payment. Thus, within the environment of FIG. 1, the communication device may be configured to implement techniques for avoiding such interference while still providing a payment token to the payment terminal if received from the recognition device.

This disclosure describes systems and techniques for enabling a communication device to communicate wirelessly with a near-field-communication (NFC)-enabled payment terminal while avoiding interference between the NFC-enabled payment terminal and other NFC payment instruments. In some instances, the communication device may receive, via a non-NFC communication protocol, a payment token from an identification device and may send, over NFC, the payment token to the NFC-enabled payment terminal for satisfying the cost of a transaction.

For example, an NFC-enabled payment terminal may include an NFC antenna configured to generate an NFC field for communicating with one or more NFC payment instructions, such as a contactless credit card, a mobile phone of a user, or the like. Upon a user placing the NFC payment instrument within a threshold distance of the payment terminal, the payment terminal may wirelessly receive payment information from the NFC payment instrument using the NFC antenna of the payment terminal. In addition, however, the systems and techniques described herein may enable the user to provide biometric or other type of information to an identification device, which may use this information to receive a payment token for providing to the payment terminal. In order to provide this payment token to the payment terminal, the identification device may wired (e.g., over USB, etc.) or wirelessly (e.g., over Bluetooth, Zigbee, etc.) send the payment token to a communication device, which in turn may send the payment token to the payment terminal over NFC. Thus, the NFC-enabled payment terminal may be configured to receive payment for a transaction over NFC from one or more NFC payment instruments, as well as over NFC from the communication device that communicates with the identification device(s).

In some instances, however, an NFC antenna of the communication device may interfere with the NFC field generated by the NFC antenna of the payment terminal, thus affecting attempted payment using NFC payment instruments. That is, if the NFC antenna of the communication device operates at the same or similar frequency and amplitude as the NFC antenna of the payment terminal (described herein as the resonant frequency), then the NFC antenna of the communication device may adversely affect the NFC field generated by the NFC antenna of the payment terminal. For example, the operating range of the NFC field may be decreased, adversely impacting the experience of a user attempting to pay for a transaction by placing an NFC payment instrument (e.g., a contactless credit card, mobile phone, etc.) within a threshold distance of the payment terminal. Thus, the following disclosure describes techniques to avoid such interference, while still allowing the communication device to provide payment tokens to the NFC-enabled payment terminal over NFC.

The systems and described techniques described herein may perform the objectives in several ways. To begin, envision that the NFC-enabled payment terminal includes an NFC antenna that is configured to operate a resonant frequency, such as 13.56 MHz. In some instances, the payment terminal may include one more input mechanisms (e.g., hard or soft buttons) that an associate of a facility may interact with in order to indicate that the payment terminal is to receive payment for a cost of a transaction. Upon activating an input mechanism, the NFC antenna of the payment terminal may generate an NFC field for enabling payment by a user with an NFC-enabled payment instrument.

In addition, a communication device that also includes an NFC antenna may reside adjacent or within a threshold distance of the payment terminal. The communication device may include an NFC chipset for communicating with the NFC-enabled payment terminal, and another communication chipset for communicating with an identification device over another wireless communication protocol, such as Bluetooth, Zigbee, WiFi Direct, etc.

In one example, a microcontroller of the NFC communication chipset may cause the NFC antenna to operate at a frequency that is different than the resonant frequency of the NFC antenna of the payment terminal and/or with an amplitude that is significantly lesser than an amplitude at which the NFC antenna of the payment terminal operates. In other words, the microcontroller of the NFC communication chipset may "detune" its NFC antenna such that the NFC antenna of the communication device does not unduly interfere with the NFC field generated by the NFC antenna of the payment terminal. In some instances, however, the microcontroller may detune the NFC antenna in an amount where the NFC antenna is still able to field-sense an NFC field generated by the NFC antenna of the payment terminal. It is to be appreciated that the microcontroller of the NFC communication chipset may change the frequency and/or amplitude of the operating frequency of the NFC antenna by changing the values of one or more capacitors and/or resistors in a matching network (or matching circuit) that couples to the NFC antenna of the communication device.

While the NFC antenna of the communication device is detuned, it may still attempt to detect the presence of an NFC field, such as any NFC field generated by the adjacent NFC-enabled payment terminal. Upon detecting such an NFC field, logic (e.g., the microcontroller of the NFC communication chipset) may generate and send an instruction to the identification device to power on one or more components of the identification device. For example, the logic may send, over USB, Bluetooth, or the like, an instruction to the identification device to turn on an imaging device of the identification device for generating image data for use in identifying a user, a microphone of the identification device generating audio data for identifying the user, or the like. In one example, the identification device comprises an imaging device that is configured to generate image data of a palm of a user, which may be used to identify a user account associated with the user and payment information associated with the user account.

Upon receiving the instruction from the communication device, the identification device may power on the one or more components, such as the imaging device. The imaging device may then detect the presence of a portion of a user, such as a palm of a user, and may correspondingly generate image data. The identification device may then send the image data, or feature data based on the image data, to one or more remote servers, which may analyze the image or feature data to attempt to identify a user account. Upon identifying a user account, the servers may identify payment information and may generate a payment token based at least in part on the payment information. It is to be appreciated that in some instances, the servers that receive the image or feature data may interact with one or more servers (e.g., of a financial institution), which may generate and provide the payment token. In any event, the one or more servers may provide the payment token back to the identification device, which may communicate the payment token (e.g., over USB, Bluetooth, or the like) to the communication device.

Upon receiving the payment token, the communication device may tune its antenna to the resonant frequency and/or amplitude associated at which the NFC antenna of the payment terminal is operating. For example, the microcontroller of the NFC communication chipset may alter characteristic(s) of the matching network such that the NFC antenna of the communication device operates at approximately 13.56 MHz and at approximate the same or similar amplitude as the NFC antenna of the payment terminal operates. The communication device may then send the payment token to the payment terminal over NFC. Upon receiving the payment token, the payment terminal may use the payment token to satisfy a cost of the pending transaction. Using the above techniques of intelligently and dynamically tuning and detuning the NFC antenna of the communication device, the communication device is able to provide the payment token to the payment terminal over NFC, while otherwise not interfering with the NFC field of the payment terminal beforehand in the event that a user pays for the transaction using an NFC-enabled payment instrument rather than the payment token generated based on user interaction with the identification device.

Further, if in fact the user does pay for the transaction using another means (e.g., an NFC-enabled payment instrument), upon processing the payment the payment terminal may instruct its NFC antenna to cease generating the NFC field. The (detuned) antenna of the communication device may, via field-sensing, detect the absence of the NFC field previously generated by the payment terminal and, in response, may generate and send (e.g., over USB, Bluetooth, or the like) a second instruction that instructs the identification device to power off the component(s) (e.g., the imaging device, microphone, etc.) of the identification device. Upon receiving this second instruction, the identification device may correspondingly power off the components.

In another example, however, the communication device may configure, as a default position, its NFC antenna to operate at the resonant frequency and amplitude of the NFC antenna of the payment terminal. That is, the microcontroller of the NFC communication chipset of the communication device may cause the NFC antenna of the communication device to operate at 13.56 MHz. In this example, the communication device may continue to field-sense and, upon identifying an NFC field generated by the NFC antenna of the payment terminal, the microcontroller may alter characteristic(s) of the matching network of the NFC antenna of the communication device to detune the NFC antenna of the communication device. That is, the microcontroller may cause the NFC antenna of the communication device to operate at a frequency that is different than the resonant frequency of the NFC antenna of the payment terminal and/or at an amplitude that is different than the amplitude of the NFC antenna of the payment terminal. In some instances, the microcontroller may detune the NFC antenna to such a degree that the NFC antenna of the communication device is generally unable to field-sense the presence of the NFC payment terminal. In addition to detuning its antenna, the communication device may send (e.g., via USB, Bluetooth, or the like) the instruction to the identification device to power on the one or more components of the identification device.

After detuning the NFC antenna and sending the instruction, the microcontroller of the communication device may periodically tune its NFC antenna to attempt to field sense the presence of the NFC field. If the communication device again senses the NFC field (meaning that the payment terminal is still awaiting payment), then the microcontroller of the communication device again detunes its NFC antenna for a predetermined amount of time before again tuning the antenna to attempt to sense the field, and so forth. If, however, upon tuning the NFC antenna, the communication device no longer senses the NFC field (e.g., because the payment terminal has received payment and is no longer awaiting payment), then the communication device may send a second instruction to the identification device instructing the identification device to power off the component(s). In addition, the communication device may cause its NFC antenna to remain tuned for the purpose of sensing any subsequent NFC field generated by the payment terminal.

If, however, a user interacts with the identification device prior to the payment terminal receiving payment, thus resulting in the communication device receiving a payment token, then the communication device may tune its NFC antenna upon receiving the payment token and may send this payment token over NFC to the payment terminal. Again, the communication device may also cause its NFC antenna to remain tuned for sensing any subsequent NFC field generated by the payment terminal.

In some instances, the communication device described herein interacts with an identification device that identifies users using biometric-recognition techniques, such as voice-recognition techniques, palm-recognition techniques, and the like. In some instances, users may enroll with an identification system that utilizes various biometric-based recognition techniques so users may be identified without having to carry or use traditional forms of identification, such as showing an ID card or accessing their personal phone. The identification system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the identification system and charging a user account for that user with the cost of the items included in their virtual shopping cart. According to the techniques described herein, a user enrolled with the identification system may need only provide biometric information by, for example, scanning a palm of the user at an imaging device, scanning a fingerprint of the user, looking at a camera of an identification device located in the facility, or the like in order to be identified by the identification system. As described above, a payment token may be generated using the data generated by the identification system and may be sent to the communication device, which in turn may provide the payment token to the payment terminal over NFC.

To utilize the identification system, a user may request to be enrolled by interacting with an identification device positioned in a facility. For example, the user may select an enroll option on a display of the identification device, issue a voice or GUI-based command requesting to be enrolled, insert a user ID card into the identification device, and/or simply present their hand or palm before the identification device to prompt the enrollment process.

Upon requesting to be enrolled in the identification system, the identification device may, with permission and/or upon explicit request by the user, begin collecting various types of biometric data, and/or other data, for the user. For example, the identification device may include one or more imaging sensors (e.g., a camera) that begins capturing image data (e.g., an individual image, a sequence of images, a video, etc.) of at least a portion of the user, such as a palm of the user, or the like. In the example of the palm, the identification device may request that the user move their hand to different angles and/or orientations as the device captures the image data and may also capture image data under different lighting conditions (e.g., no flash, flash, different light polarizations, near infrared light, infrared light, etc.), to generate image data representing the palm of the user under different environmental conditions.

In some examples, the user may already have an account registered with the inventory-management system to pay for items selected during a shopping session. In such examples, the identification device may determine a user account with which the user is registered in various ways, such as by requesting that the user insert a personal ID card (e.g., driver's license), scan a barcode that may be presented on a display of a phone of the user, login with his or her login credentials, and so forth.

Once the identification device has obtained the image data representing the palm or other potion of the user, the identification device may utilize this data to enroll the user with the identification system. In some examples, the identification system may be implemented entirely on the identification device, which may include the software, firmware, and/or hardware components to implement the techniques described herein. However, in some examples, the identification system may be implemented according to a split architecture where the identification device performs client-side enrollment and identification techniques, and more intensive and/or advanced processing may be performed using a backend, server-based implementation. For example, the identification system may include one or more network-based computing devices positioned at a separate location in the facility, and/or at a remote, cloud-based location. The network-based devices may include various components for implementing the identification system.

In such examples, the identification device may send the image data, and/or feature data generated by the user recognition device using the image data, to the network-based devices to enroll the user for the identification system. The network-based devices of the identification system may perform various processing techniques on the image data and/or feature data such that the identification system is able to identify the user from subsequently received image data and/or feature data.

The identification system may analyze the image data to determine various features of the user. For example, the identification system may extract and/or generate, based on the image data, palm-feature data representing the palm of the user. This palm-feature data may represent information that is potentially unique to the palm of the user, such as the pattern or shape of creases in the user's palm, the pattern of veins of the user's palm, the geometry of one or more characteristics of the user's hand (e.g., finger sizes/shape, palm size/shape, etc.), markings on the user's hand (e.g., tattoos, moles, scars, etc.), and/or the like. The identification system may utilize any type of processing techniques to generate the palm-feature data and may represent the palm of the user depicted in the image data using various types of data structures, such as feature vectors. In some examples, the identification system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the identification system may store the feature data in an image database and associate the feature data with a user profile for that specific user. In this way, when subsequent image data is received for a user at an identification device, the feature data stored in the image database may be compared with the feature data generated from the subsequent image data to identify a user profile for the user represented in the subsequent image data. Upon identifying a user profile, meanwhile, payment information associated with the corresponding user provide may be identified and used to generate a payment token for satisfying a cost of a transaction.

In this way, the user may be enrolled for use of the identification system such that, after completing subsequent shopping sessions, the user may checkout by placing his or her palm over an imaging component of an identification device to allow the identification system to automatically recognize the user. The identification device may detect the presence of the user (e.g., detect the palm, detect the speech utterance, detect a touch input via a touch display, etc.), and begin streaming image data to the backend devices of the identification system. The backend devices of the identification system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

However, in some cases the identification system may experience difficulties when identifying a user based on image data representing the palm of the user received from an identification device. For instance, the image data may include one or more images of the palm of the user that were taken such that the palm appears blurry, represented under poor lighting conditions, is at least partially occluded by another object, and/or other issues may arise (e.g., the look and/or makeup of the palm of the user has significantly changed over time). In such examples, the identification system may determine that the palm of the user at least partially corresponds to gallery image data for one or more user profiles, but without a high enough confidence levels that are acceptable for associating a transaction with a user profile. In another example, the identification system may match the palm of a user to a specific user profile, but an operator of the facility may receive disputes or inquiries from the user indicating that the user believes they were incorrectly identified as performing a transaction in the facility.

This systems and techniques described herein may further include an identity-verification system to analyze image data representing palms of users using a segmented, characteristic-based approach by comparing palm-feature data representing characteristics of a palm of a user (or "query palm") with gallery palm-feature data of palms for user profiles (or "gallery palms"). The identity-verification system may identify characteristics of the query palm having salient or discriminative features, and compare palm-feature data for those discriminative characteristics to palm-feature data representing corresponding characteristics of gallery palms of enrolled users. The identity-verification system may compare characteristics of the query palm with corresponding characteristics of gallery palms until the system is confident that the query palm corresponds to a gallery palm of a user profile. In some examples, the characteristics of the palms being compared may comprise characteristics of patches of the palms, such as the wrinkles, lines veins, scars, etc., for corresponding patches of the palms. In various examples, the characteristics of the palms being compared may be global characteristics, such as the shape of the palm, shape of the hand, size of the fingers, principle lines, veins in the hand, and/or other global features. By performing simpler characteristic-based (e.g., patch-based) sameness verification tasks, the system may reduce the amount of time and computing resources utilized to verify an identity of a user as opposed to top-level, palm-identity verification.

In some instances, the identification system may process image data representing a palm of a user, or the query palm, that was received from an identification device in a facility and may be associated with a transaction occurring in the facility. The identification system may have identified one or more possible candidate user profiles having enrolled palms, or gallery palms, that at least partially correspond or match to the query palm. However, the identification system may determine that the query palm and gallery palms correspond with too low of confidence levels that are acceptable for associating a transaction with the user profiles. For instance, the identification system may be 55% confident, 65% confident, and 85% confident that the query palm corresponds to user profile A, user profile B, and user profile C, respectively. However, the identification system may be configured to associate transactions with user profiles only when the confidence level is at or above a threshold value, such as 100% confidence.

In such examples, the identification system may provide the identity-verification system with the one or more user profiles that are determined to be the top candidates for corresponding to the query palm (e.g., user profiles A, B, and C). The identity-verification system may then perform techniques for analyzing feature data representing the query palm to feature data stored with the enrolled user profiles that represent the enrolled, gallery palms.

In some instances, the identity-verification system may use a multi-stage cascading approach. A first stage of the cascading approach may include the identity-verification system comparing feature data representing the principle creases or lines of the query palm and gallery palms. The identity-verification system may compare the shape and/or geometry of the principles creases of the palms to determine whether or not the principle creases match between the query palm and gallery palms. If the principles lines in the query palm and gallery palms do not match above a threshold similarity level, the identity-verification system may discard the user profiles with mismatching gallery palms from further consideration for corresponding to the query palm.

In a second stage of the cascading approach, the identity-verification system may break down the top-level palm identity verification tasks(s) into simpler, characteristic-based sameness verification tasks where the characteristics being compared comprise less than all of the palms. Generally, palms of users contain salient features that contribute to their uniqueness, such as (i) epidermal ridges exhibiting deltas, loops and arch formations, (ii) bifurcation and terminal points of the epidermal ridge lines, (iii) intersection points of principle and crease lines, (iv) markings such as moles, freckles, tattoos, scars, (v) veins, vein junctions, terminal points of veins, (vi) shapes and/or geometries of the hand or one or more fingers, and/or other salient features.

The identity-verification system may utilize one or more vision algorithms to generate a set of characteristic proposals that represent characteristics of the query palm (or hand) that are unique compared to other characteristics, such as other patches, of the query palm. Further, the identity-verification system may identify corresponding patches or characteristics of the gallery palms using alignment components to find the spatially corresponding patches or characteristics. In some examples, the identity-verification system may identify the characteristics based not only on salient features, but also identify characteristics that are represented in different locations on the palms for diversity of characteristics across the palms.

After identifying the proposed characteristics of the palms, the identity-verification system may then extract or generate feature data that represent the characteristics of the query and gallery palms that are to be compared with each other. The identity-verification system may perform a characteristic-by-characteristic comparison for the query and gallery palm(s). By identifying and comparing characteristics of the palms, various advantages may be provided over top-level palm verification tasks. For instance, by comparing smaller amounts of feature data representing patches or characteristics of the palms as opposed to the entire palm, the matrix-based math used in comparing the patches of the palms is greatly reduced, which may decrease the amount of time and/or computing resources required to compare the palms. In some instances, comparing the palms using a characteristic-by-characteristic based analysis may require less time and/or computing resources than comparing the entirety of the palms using palm-level representations of the palms. Further, the characteristic-based analysis results in segregation of the feature data representing the palms such that each analysis system, component, human agent, or other verification source may be provided with less than all of the image representing a palm. This may increase the security of the identity-verification system in that the comparisons of characteristics of the palms may be isolated such that an entire representation of the palms may not be readily available to a single source, but rather, only characteristics of palms may be available to a single source. Further, in examples where algorithms are used to compare the palms that rely on momentum or a history, the characteristic-by-characteristic analysis may reduce bias in the momentum algorithms by dividing the comparisons between different patches, or different characteristics. Even further, the techniques described herein may provide consistency of identity decisions across different patches or characteristics of the images which in turn provides natural confidence values to the decision, and help differentiate between high, moderate, and low decisions.

The identity-verification system may compare the feature data representing the corresponding characteristics of the query palm and gallery palm(s) until the system has determined that an overall measure of similarity between the query palm and a gallery palm is above a threshold measure of similarity. For instance, each time the identity-verification system analyzes a patch of the query palm with reference to a patch of a gallery palm, the identity-verification system may update an overall confidence score or measure of similarity for the query and gallery palms. The identity-verification system may iteratively compare feature data representing characteristics of the query palm and gallery palm(s) until the identity-verification system is confident that a gallery palm does not correspond to the query palm, and/or until the identity-verification system determines that a gallery palm does correspond to the query palm.

Upon determining that the query palm corresponds to a gallery palm by more than a threshold (e.g., 100% correlation, 99% correlation, etc.), the identity-verification system may output an indication of the decision. In a facility session example, the identity-verification system may further store an association between a transaction performed via the query palm and the user profile enrolled for the gallery palm. Stated otherwise, the identity-verification system may associate a transaction in a facility with a user profile upon determining that the user of that user profile used their palm (the query palm) to check-out, and that feature data of the query palm does correspond to the feature data of the gallery palm that the user enrolled in an image database of the identification system.

Accordingly, the identity-verification system may be configured to identify, or verify, an identity of a user via palm-recognition techniques. In some instances, the characteristic-based analysis may be used as a primary technique to identify the identity of users via their palms (or other biometric, such as facial features), and in other examples the characteristic-based analysis may be used as an identity audit tool to verify an identity of a user. In some instances, a user may submit an inquiry or complaint indicating that they believe their profile was inappropriately identified for a transaction or session. In such examples, the gallery image may be enrolled with a profile of the user, and the query image may be compared to the gallery image to determine whether or not the user's palm was properly identified as corresponding to the query palm.

In some examples, the query palm and gallery palm may be submitted to the identity-verification system in instances where less than a threshold number of characteristics were compared to determine that the query and gallery palms were determined to correspond. For instance, the identification system may determine that a query palm and gallery palm correspond by more than a threshold measure of similarity. However, if the identification system compares less than a threshold number of characteristics (e.g., less than two, less than three, etc.), the identity-verification system may be called to verify the palms as being the same palms or not. For instance, the identification system may only have image data clearly depicting one or two characteristics of the palms, such as one patch of the palms. Thus, even if the identification system determines that the available patch for each palm correspond strongly to each other, it may be difficult to determine that the query and gallery palm are the same due to only comparing a single characteristic of the palms. In such examples, the two (or more) images may be provided to the identity-verification component to determine whether or not the palms correspond to each other across additional characteristics.

Although the techniques described herein are primarily with reference to identifying users for the purpose of identifying a user account to charge for items selected from a materials handling facility, the techniques are equally applicable to any industry in which user recognition may be helpful. For instance, the identification system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations. In some instances, the techniques may be utilized to identify users for other reasons beyond associating transactions for users, such as allowing and disallowing entrance into buildings, room, etc.

Additionally, while the techniques described herein are primarily with reference to identifying users using palm feature data, the user-identification techniques are equally applicable to any type of biometric data, such as fingerprint data, voice data, and/or any other type of biometric data and/or other data.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment of a materials handling facility 100 that includes a user 102 and an identification device 104 that communicates with a payment terminal via a communication device 108. The payment terminal 106 may be configured to receive payment for a transaction via one or more payment instruments (e.g., chip-and-pin credit cards, contactless credit cards, mobile phones, etc.) as well as via a payment token received from the identification device 104 via the communication device. For example, within the facility, the user 102 may acquire one or more items and may acquire (e.g., purchase) the items by providing payment to the payment terminal 106 using an NFC payment instrument, based on providing identification data to the identification device 104, or the like.

In some instances, the materials handling facility 100 (or "facility") may include one or more sensors on or near inventory location(s) from which the user 102 may acquire the items. In some examples, the sensors include imaging sensors that are configured to capture video data within the facility 100 for use in determining results associated with events, such as the picking of items by the user 102. In other instance, meanwhile, some or all of the sensors may reside on a mobile cart that the user 102 places items into as the user 102 navigates through the facility 100. In some instances, the facility 100 may include an array of sensors and may be monitored and/or otherwise associated with an inventory-management system configured to determine events in the facility 100 associated with the user 102, such as taking items that the user 102 would like to purchase. The inventory-management system may track the items selected by the user 102 and maintain a virtual shopping cart which includes all of the items taken by the user 102. Thus, when a user 102 would like to leave the facility 100 with the items they have taken, the inventory-management system may charge a user account associated with the user 102 for the cost of the items that were taken.

With the environment of FIG. 1, the user 102 may pay for items acquired by the user using a physical payment instrument or using identification data generated by the identification device 104. For example, the payment terminal 106 may include an NFC antenna that generates an NFC field to allow the user 102 to pay for a transaction using an NFC-enabled payment instrument, such as a contactless credit card, a mobile phone, or the like. The payment terminal 106, or another payment terminal, may also include one or more mechanisms (e.g., a chip reader, magnetic-stripe reader, etc.) for accepting payment from non-NFC payment instruments or for accepting cash. In addition, the payment terminal 106 may communicate with the communication device 108 (which in turn may communicate with the identification device 104) for receiving a payment token for satisfying a cost of a transaction.

In the illustrated example of FIG. 1, the user 102 interacts with the identification device 104 for satisfying a cost of acquiring one or more items acquired by the user 102 from the facility 100. As illustrated, the identification device may communicate with the communication device 108 via a first communication protocol (or channel) 110, while the communication device 108 may communicate with the payment terminal via a second communication protocol (or channel) 116. In some instances, the communication protocol 116 comprises NFC or another wireless communication protocol, while the communication protocol 110 comprises one or more non-NFC communication protocols, such as USB, Bluetooth, Zigbee, WiFi Direct, and/or the like. Further, it is noted that while FIG. 1 illustrates the communication device 108 and the payment terminal 106 as separate from one another, in other instances the communication device 108 may couple to the payment terminal 106. For instance, the communication device 108 may adhere or otherwise couple to a side, top, or back of the payment terminal 106. In each instance, these devices may communicate via the communication protocol 116. Further, while FIG. 1 illustrates the protocols as wireless, in other instances the protocols may be wired protocols, such a USB or the like. Further, it is to be appreciated that the communication device 108 may couple to and communicate with the identification device 104 via a wired connection, such as a USB connection.

In some instances, upon the user 102 indicating that the user 102 would like to pay for one or more items, an associate of the facility 100 or a device within the facility 100 may provide input to the payment terminal 106 readying the payment terminal 106 to accept payment. In response to this input, the NFC antenna of the payment terminal may generate an NFC field, such that the payment terminal 106 is prepared to accept payment via NFC from an NFC-enabled payment instrument, as well as from the communication protocol 116. In some instances, the NFC antenna 114 may operate at a resonant frequency and with a resonant amplitude. For example, the NFC antenna may operate at 13.56 MHz for interacting with a payment instrument or the communication device 108 over NFC.

As illustrated, the communication device 112 may also include an NFC antenna 112, which may be used to field-sense the presence of the NFC field generated by the payment terminal 106. Upon detecting the NFC field, the communication device 108 may notify, via the communication protocol 110, the identification device 104. For example, the communication device 108 may send a message to the identification device 104 instructing the identification device power on the image device and be ready to receive image data for identifying a user. Upon receiving this message, the identification device 104 may power on the imaging device (and/or other components). Furthermore, upon the detecting the presence of the hand of the user 102, the identification device 104 may generate image data (in this example) and may provide this image data to one or more servers 120 over one or more networks 118.

The network(s) 118 may include private networks such as an institutional or personal intranet, public networks such as the Internet, or a combination thereof. The network(s) 118 may utilize wired technologies (e.g., wires, fiber optic cable, and so forth), wireless technologies (e.g., radio frequency, infrared, acoustic, optical, and so forth), or other connection technologies. The network(s) 118 is representative of any type of communication network, including one or more of data networks or voice networks. The network(s) 118 may be implemented using wired infrastructure (e.g., copper cable, fiber optic cable, and so forth), a wireless infrastructure (e.g., cellular, microwave, satellite, etc.), or other connection technologies.

As illustrated, the servers 120 may include one or more user accounts 122, an identification component 124, and a payment-information component 126. In some instances, the servers are collocated and operated by a common entity, while in other instances the servers are located at different locations and operated by different entities. For example, a first entity may operate one or more servers that include the identification component 124 and the user accounts 124, while a second entity (e.g., a financial institution) may operate one or more servers that include the payment-information component 126 for generating a payment token, as described below.

Upon receiving the image data from the identification device 104, the identification component 124 of the servers 120 may attempt to identify, from the user accounts 122, the user account associated with the user 102 that is associated with the image data. For example, the identification component 124 may use one or more trained models for determining which user account is associated with the received image data. Upon identifying the user account, this information may be used by the payment-information component 126 to identify payment information associated with the identified user account and/or the identified user, which in turn may be used to generate a payment token that may be used to pay for the transaction. In some instances, one or more servers operated by a financial institution generate the payment token, which is provided back to the identification device 104 via the network(s) 118 in some instances.

Upon receiving the payment token from the one or more servers 120, the identification device 104 may send, via the communication protocol 110, the payment token to the communication device 108. The communication device 108, meanwhile, may send the payment token to the payment terminal 106 via the communication protocol 116 upon receiving the payment token from the identification device 104. In some instances, the communication device 108 sends this payment token to the payment terminal 106 via NFC. Upon receiving the payment token, the payment terminal may use the payment token to satisfy the cost of the transaction, in a manner similar to if the user 102 had placed an NFC-enabled payment instrument adjacent the payment terminal 106 for payment.

As the reader will appreciate, the above environment thus provides a system that enables the user 102 to pay for a cost a transaction using, for example, NFC-enabled payment instrument(s) and/or using palm or other identification data generated by the identification device 104. As introduced above, however, in some instances, the NFC antenna 112 of the communication device 108 may cause interference with the NFC field generated by the NFC antenna 114 of the payment terminal 106, thus negatively affecting the operating range of the NFC field. Thus, as described below, the communication device 108 may be configured to dynamically tune and/or detune its NFC antenna 112 to lessen this interference while still enabling payment via NFC-enabled payment instrument(s) and via the identification device 104.

In one example, the communication device 108 may configure the NFC antenna 112 to operate in a default "detuned" state. That is, a microcontroller of the communication device 108 may cause the NFC antenna 112 to operate at a frequency that is different than the resonant frequency of the NFC antenna 114 of the payment terminal 106 and/or with an amplitude that is significantly lesser than an amplitude at which the NFC antenna 114 operates. In other words, the microcontroller of the communication device 108 may "detune" its NFC antenna 112 such that the NFC antenna 112 of the communication device 108 does not unduly interfere with the NFC field generated by the NFC antenna 114 of the payment terminal 106. In some instances, however, the microcontroller may detune the NFC antenna 112 in an amount where the NFC antenna 112 is still able to field-sense the NFC field generated by the NFC antenna 114 of the payment terminal 106. It is to be appreciated that the microcontroller of the communication device 108 may change the frequency and/or amplitude of the operating frequency of the NFC antenna 112 by changing the values of one or more capacitors and/or resistors in a matching network (or matching circuit) that couples to the NFC antenna 112 of the communication device 108.

While the NFC antenna 112 of the communication device is detuned, it may still attempt to detect the presence of an NFC field, such as any NFC field generated by the adjacent NFC-enabled payment terminal 106. Upon detecting such an NFC field, logic (e.g., the microcontroller of the communication device 108) may generate and send an instruction to the identification device 104 to power on one or more components of the identification device. For example, the logic may send, over the communication protocol 110, an instruction to the identification device 104 to turn on an imaging device of the identification device for generating image data for use in identifying the user 102. Upon receiving the instruction from the communication device 108, the identification device 104 may power on the one or more components, such as the imaging device. The imaging device may then detect the presence of a portion of a user, such as a palm of a user, and may correspondingly generate image data. The identification device 104 may then send the image data, or feature data based on the image data, to the servers 120, as described above, which may analyze the image or feature data to attempt to identify a user account. Upon identifying a user account, payment-information component 126 may identify payment information and may generate a payment token based at least in part on the payment information. The one or more servers may then provide the payment token back to the identification device 104, which may communicate the payment token to the communication device 108 via the communication protocol 110.

Upon receiving the payment token, the communication device 108 may tune its NFC antenna 112 to the resonant frequency and/or amplitude associated at which the NFC antenna 114 of the payment terminal 106 is operating. For example, the microcontroller of the communication device 108 may alter characteristic(s) of the matching network such that the NFC antenna 112 of the communication antenna operates at approximately 13.56 MHz and at approximate the same or similar amplitude as the NFC antenna 114 of the payment terminal 106 operates. The communication device 108 may then send the payment token to the payment terminal 106 over NFC using the NFC antenna 112. Upon receiving the payment token using its NFC antenna 114, the payment terminal 106 may use the payment token to satisfy a cost of the pending transaction. Using the above techniques of intelligently and dynamically tuning and detuning the NFC antenna 112 of the communication device 108, the communication device 108 is able to provide the payment token to the payment terminal over NFC, while otherwise not interfering with the NFC field of the payment terminal 106 beforehand in the event that the user 102 pays for the transaction using an NFC-enabled payment instrument rather than the payment token generated based on user interaction with the identification device 104.

Further, if in fact the user 102 does pay for the transaction using another means (e.g., an NFC-enabled payment instrument), upon processing the payment the payment terminal 106 may instruct its NFC antenna 114 to cease generating the NFC field. The (detuned) antenna 112 of the communication device 108 may, via field-sensing, detect the absence of the NFC field previously generated by the payment terminal 106 and, in response, may generate and send, via the communication protocol 110, a second instruction that instructs the identification device 104 to power off the component(s) (e.g., the imaging device) of the identification device 104. Upon receiving this second instruction, the identification device 104 may correspondingly power off the components.

In another example, however, the communication device 108 may configure its NFC antenna 112 to operate at the resonant frequency and amplitude of the NFC antenna 114 of the payment terminal 106 when attempting to detect any NFC field generated by the payment terminal 106. That is, the microcontroller of the communication device 108 of the communication device may cause the NFC antenna 112 of the communication device 108 to operate at 13.56 MHz. In this example, the communication device 108 may continue to field-sense and, upon identifying an NFC field generated by the NFC antenna 114 of the payment terminal 106, the microcontroller may alter characteristic(s) of the matching network of the NFC antenna 112 to detune the NFC antenna 112. That is, the microcontroller may cause the NFC antenna 112 of the communication device 108 to operate at a frequency that is different than the resonant frequency of the NFC antenna 114 of the payment terminal 106 and/or at an amplitude that is different than the amplitude of the NFC antenna 114 of the payment terminal 106. In some instances, the microcontroller may detune the NFC antenna 112 to such a degree that the NFC antenna 112 of the communication device 108 is generally unable to field-sense the presence of the NFC payment terminal 106. In addition to detuning its antenna 112, the communication device may send, via the communication protocol 110, the instruction to the identification device 104 to power on the one or more components of the identification device 104.

After detuning the NFC antenna 112 and sending the instruction, the microcontroller of the communication device 108 may periodically tune its NFC antenna 112 to attempt to field sense the presence of the NFC field generated by the payment terminal 106. If the communication device again senses the NFC field (meaning that the payment terminal 106 is still awaiting payment), then the microcontroller of the communication device 108 again detunes its NFC antenna 112 for a predetermined amount of time before again tuning the antenna 112 to attempt to sense the field, and so forth. If, however, upon tuning the NFC antenna 112, the communication device 108 no longer senses the NFC field (e.g., because the payment terminal 106 has received payment and is no longer awaiting payment), then the communication device 108 may send a second instruction to the identification device 104 instructing the identification device to power off the component(s). In addition, the communication device 108 may cause its NFC antenna 112 to remain tuned for the purpose of sensing any subsequent NFC field generated by the payment terminal 106.

If, however, the user interacts with the identification device 104 prior to the payment terminal 106 receiving payment, thus resulting in the communication device 108 receiving a payment token, then the communication device 108 may tune its NFC antenna 112 upon receiving the payment token and may send this payment token over the communication protocol 116 (e.g., NFC) to the payment terminal 106. Again, the communication device 108 may also cause its NFC antenna 112 to remain tuned for sensing any subsequent NFC field generated by the payment terminal 106.

Figure 2A:
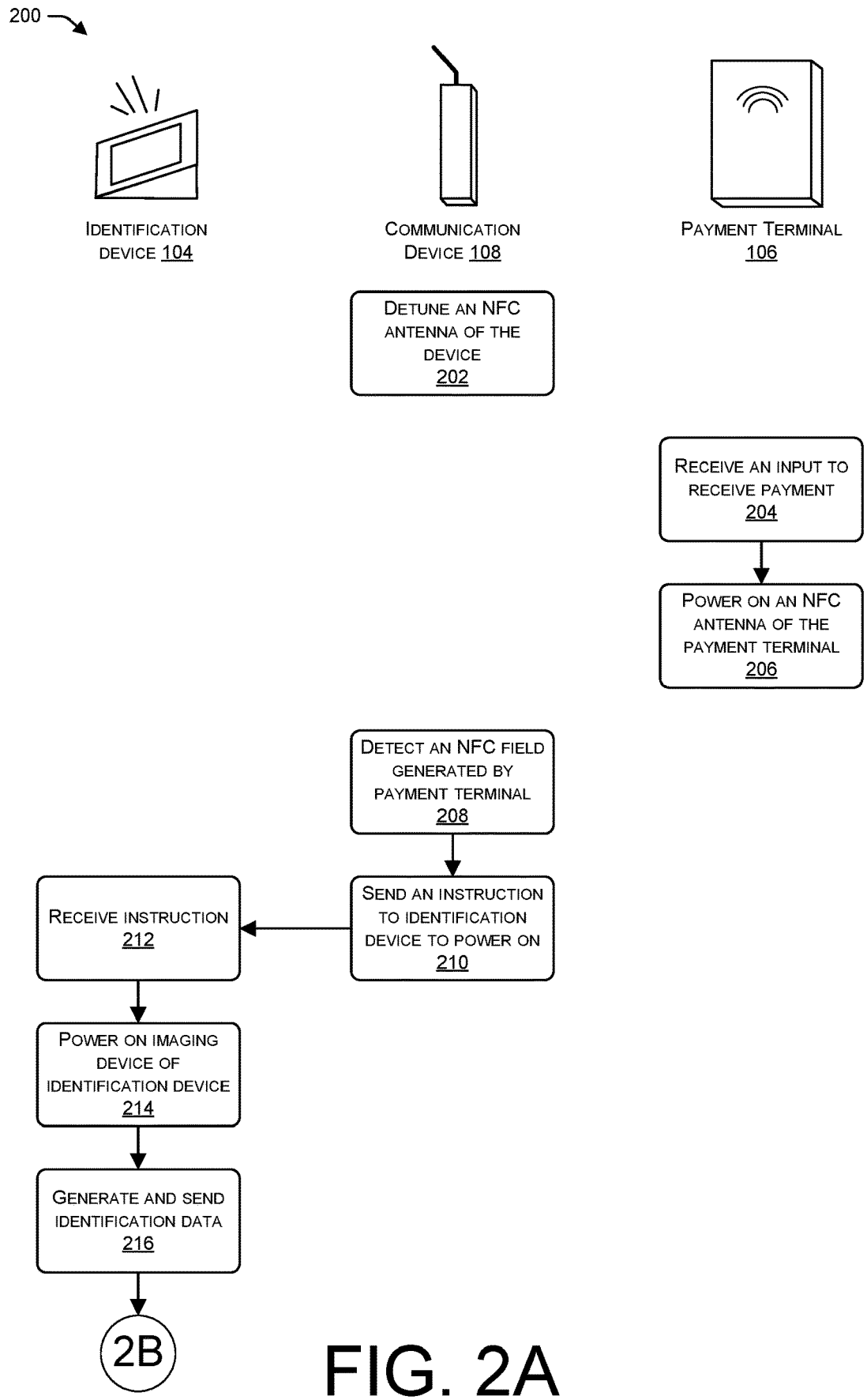
FIGS. 2A-B collectively illustrate a flow diagram of an example process that includes detuning the NFC antenna of the communication device to avoid interference with the NFC antenna of the payment terminal, while later tuning the NFC antenna of the communication device to a resonant frequency of the NFC antenna of the payment terminal and sending a payment token to the payment terminal via NFC if the communication device receives the payment token from the identification device.
Figure 2B:
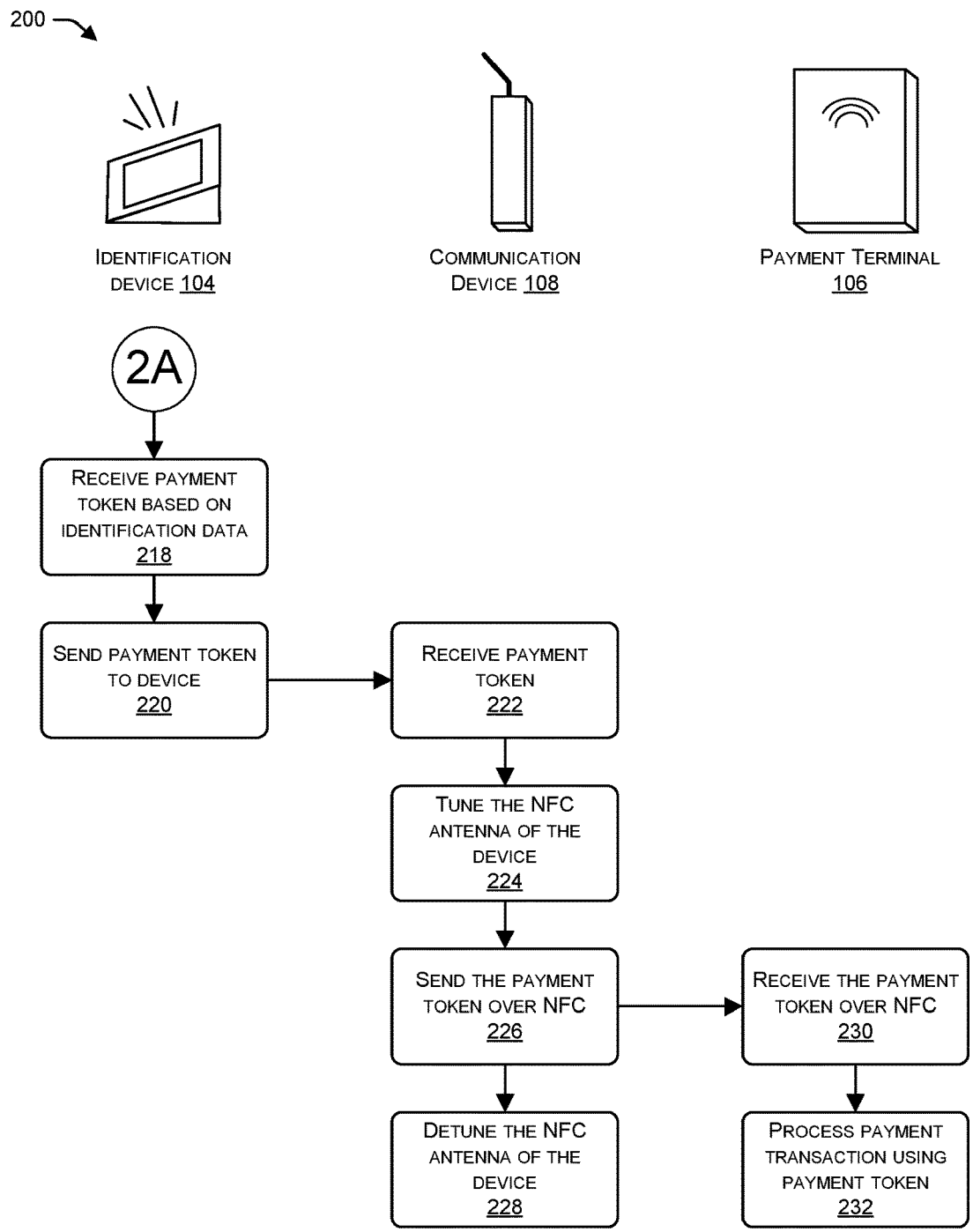

FIGS. 2A-B collectively illustrate a flow diagram of an example process 200 that the devices of FIG. 1 may implement for dynamically tuning and detuning an NFC antenna of a communication device. The process 200, as well as processes 300, 400, 500, 700, and 800, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At an operation 202, the communication device 108 may detune its NFC antenna 112. As described above, this may comprise altering characteristic(s) of the matching network or circuit coupled to the NFC antenna such that the NFC antenna does not operate at a resonant frequency and/or amplitude of an NFC antenna of a second device, such as the payment terminal 106. In some instances, however, the communication device 108 detune the NFC antenna 112 in an amount where the NFC antenna 112 is still able to field-sense an NFC field generated by the NFC antenna 114 of the payment terminal 106.

At an operation 204, the payment terminal 106 receives an input to receive payment. For example, an associate at a facility or the user engaging in the transaction may operate the payment terminal to indicate that payment is to be received. At an operation 206, the payment terminal 106 may power on its NFC antenna 114, thus generating an NFC field.

At an operation 208, the communication device 108 may use its NFC antenna 112 to detect the NFC field generated by the payment terminal 106. In response, at an operation 210, the communication device 108 may send an instruction to the identification device 104 instructing one or more components of the identification device 104 to power on. The identification device 104 may receive the instruction at an operation 212 and, at an operation 214, may power on an imaging device and/or one or more other components of the device 104.

In this example, the user engaging in the transaction may choose to pay for the one or more items using the identification device. Thus, at an operation 216, the identification device may generate identification data and may send this identification data to the servers 120. For example, upon the user 102 placing a palm of the user over the identification device 104, the identification device may generate image data of the palm of the user and may send this image data to the servers 120.

FIG. 2B continues the illustration of the process 200 and includes, at an operation 218, the identification device 104 receiving a payment token that has been generated based on the image data generated by the identification device 104. At an operation 220, the identification device 104 sends the payment token (e.g., over on a non-NFC channel in some instances) to the communication device 108, which receives the payment token at an operation 222.

At an operation 224, the communication device 108 tunes the NFC antenna 112 of the communication device 108. For example, a microcontroller of the NFC communication chipset of the communication device 108 may alter characteristic(s) of the matching network such that the NFC antenna 112 of the communication device 108 operates at approximately 13.56 MHz and at approximate the same or similar amplitude as the NFC antenna 114 of the payment terminal 106 operates. At an operation 226, and after tuning the NFC antenna 112, the communication device 108 sends the payment token over NFC to the payment terminal 106. In addition, at an operation 228, the communication device 108 may also again detune the NFC antenna 112, similar or the same as the operation 202. At an operation 230, meanwhile, the payment terminal receives the payment token from the communication device 108 over NFC and, at an operation 232, processes a payment transaction using the received the payment token.

Figure 3A:
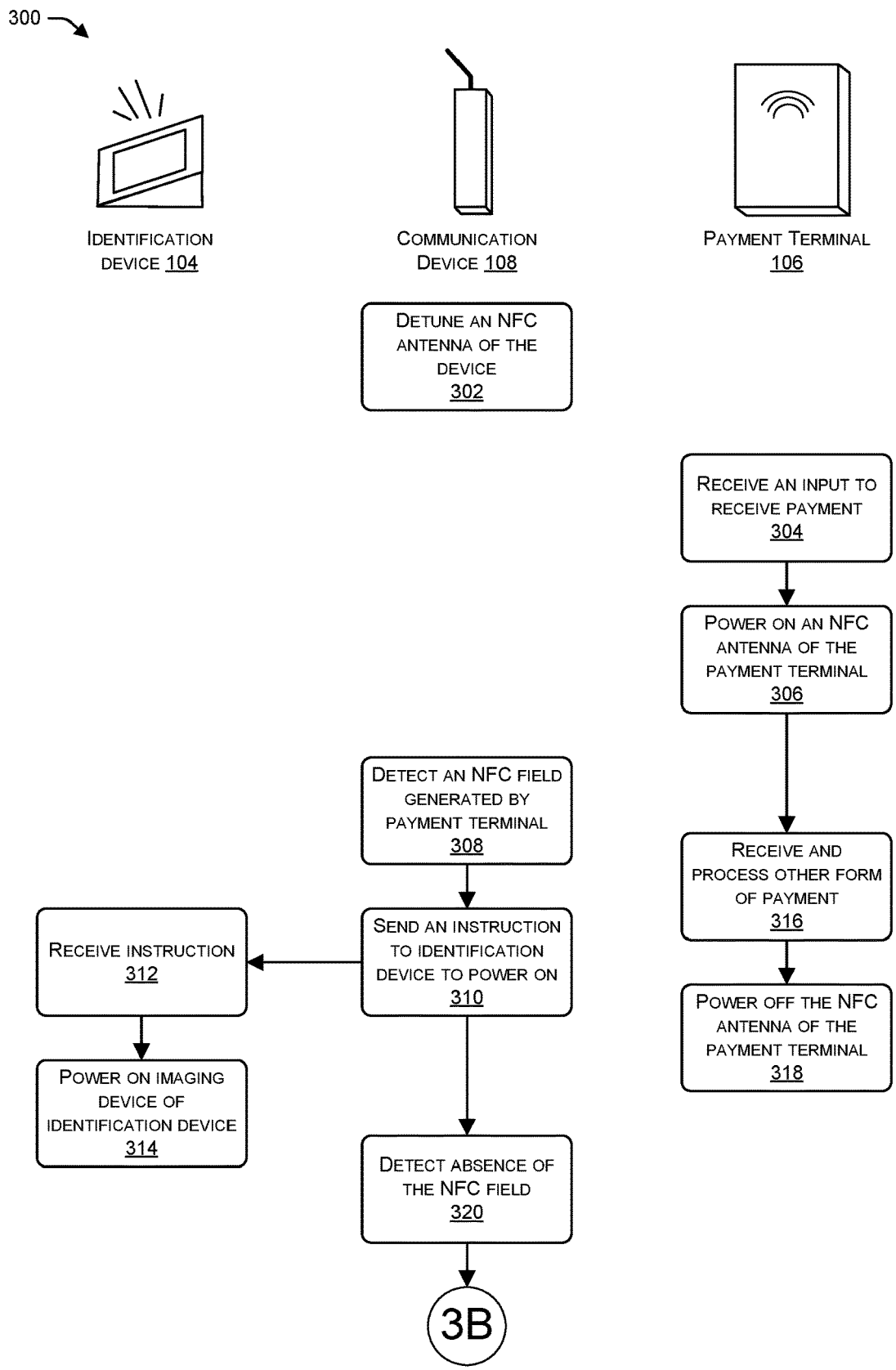
FIGS. 3A-B collectively illustrate a flow diagram of an example process that includes detuning the NFC antenna of the communication device to avoid interference with the NFC antenna of the payment terminal, detecting that the payment terminal is generating an NFC field, instructing the identification device to power on an imaging device, detecting an absence of the NFC field, and instructing the identification to power off the imaging device.
Figure 3B:
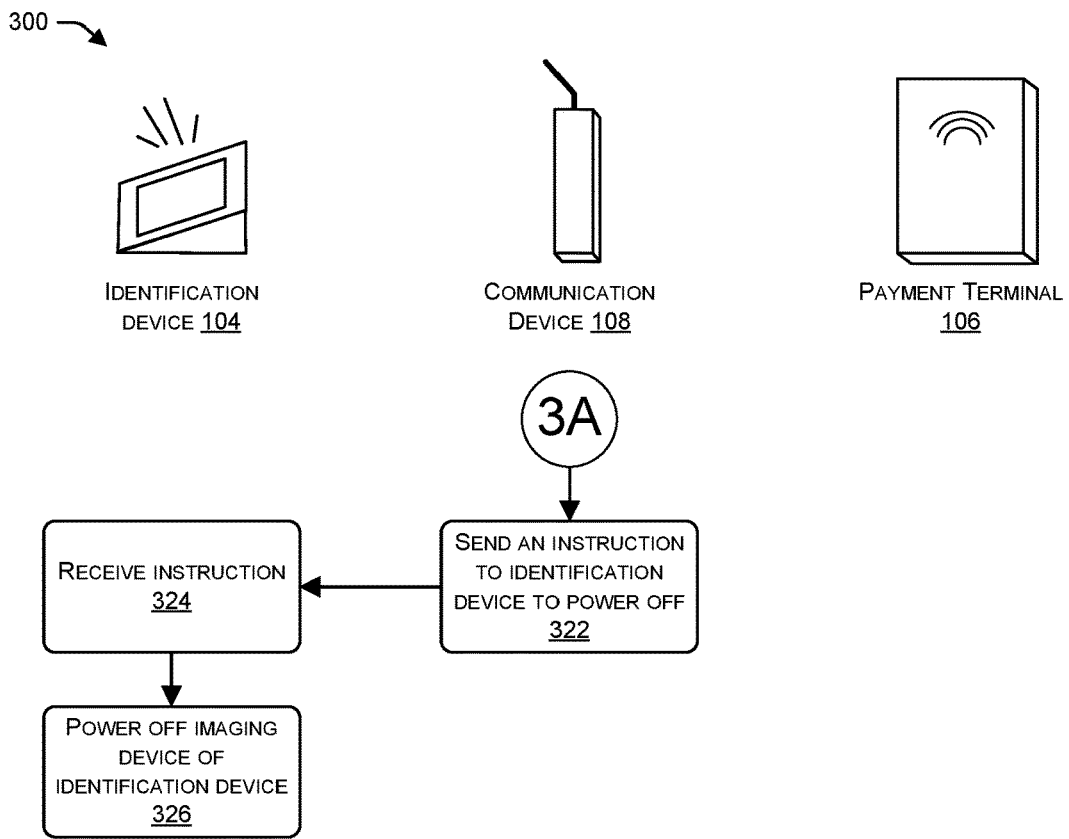

FIGS. 3A-B collectively illustrate a flow diagram of an example process 300 in instances where the user 102 does not pay for the transaction using the identification device 104. At an operation 302, the communication device 108 may detune its NFC antenna 112. As described above, this may comprise altering characteristic(s) of the matching network or circuit coupled to the NFC antenna such that the NFC antenna does not operate at a resonant frequency and/or amplitude of an NFC antenna of a second device, such as the payment terminal 106. In some instances, however, the communication device 108 detune the NFC antenna 112 in an amount where the NFC antenna 112 is still able to field-sense an NFC field generated by the NFC antenna 114 of the payment terminal 106.

At an operation 304, the payment terminal 106 receives an input to receive payment. For example, an associate at a facility or the user engaging in the transaction may operate the payment terminal to indicate that payment is to be received. At an operation 306, the payment terminal 106 may power on its NFC antenna 114, thus generating an NFC field.

At an operation 308, the communication device 108 may use its NFC antenna 112 to detect the NFC field generated by the payment terminal 106. In response, at an operation 310, the communication device 108 may send an instruction to the identification device 104 instructing one or more components of the identification device 104 to power on. The identification device 104 may receive the instruction at an operation 312 and, at an operation 314, may power on an imaging device and/or one or more other components of the device 104.

At an operation 316, however, the payment terminal 106 receives and processes payment for the transaction using a form of payment other than a payment token generated in response to the identification device 104 generating image data. For example, the user 102 may have used a contactless credit card or other NFC-enabled credit card to pay for the transaction. After receiving payment, the payment terminal 106 powers off the NFC antenna 114 of the payment terminal 106 at an operation 318. Sometime after the payment terminal 106 powering off the NFC antenna 114, the (detuned) NFC antenna 112 of the communication device 108 detects the absence of the NFC field at an operation 320.

FIG. 3B continues the illustration of the process 300 and includes, at an operation 322, the communication device 108 sending, in response to detecting the absence of the NFC field an instruction to the identification device 104 to power off the component(s). The identification device 104 receives the instruction at an operation 324 and, at an operation 326, powers off the imaging device of the identification device 104.

Figure 4A:
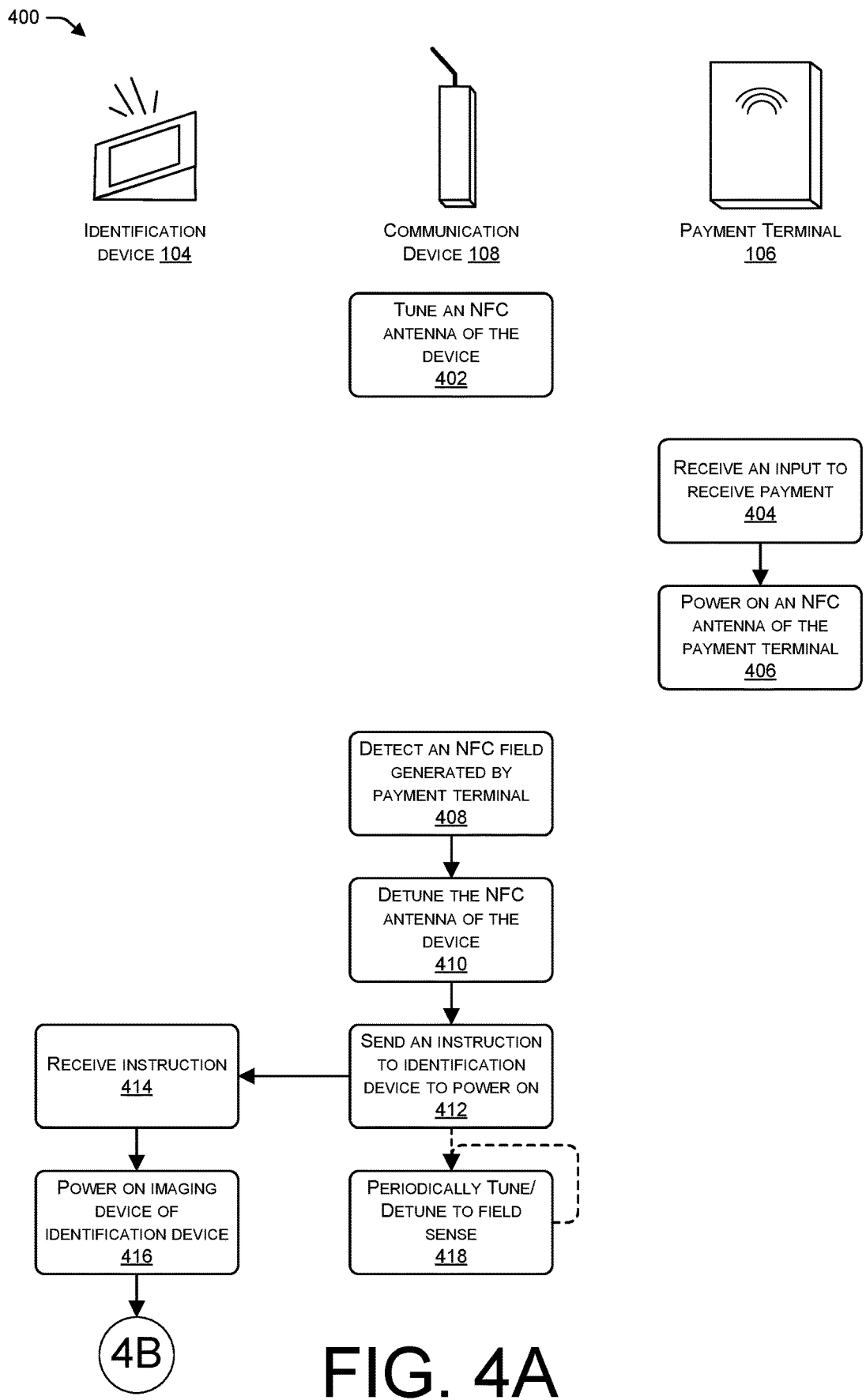
FIGS. 4A-B collectively illustrate a flow diagram of an example process that includes tuning the NFC antenna of the communication device to a resonant frequency of the NFC antenna of the payment terminal, detecting an NFC field generated by the payment terminal and, in response, detuning the NFC antenna of the communication and instructing the identification device power on the imaging device. In response to receiving a payment token from the identification device, the communication device may tune its antenna to the resonant frequency and send the payment token to the payment terminal over NFC.
Figure 4B:
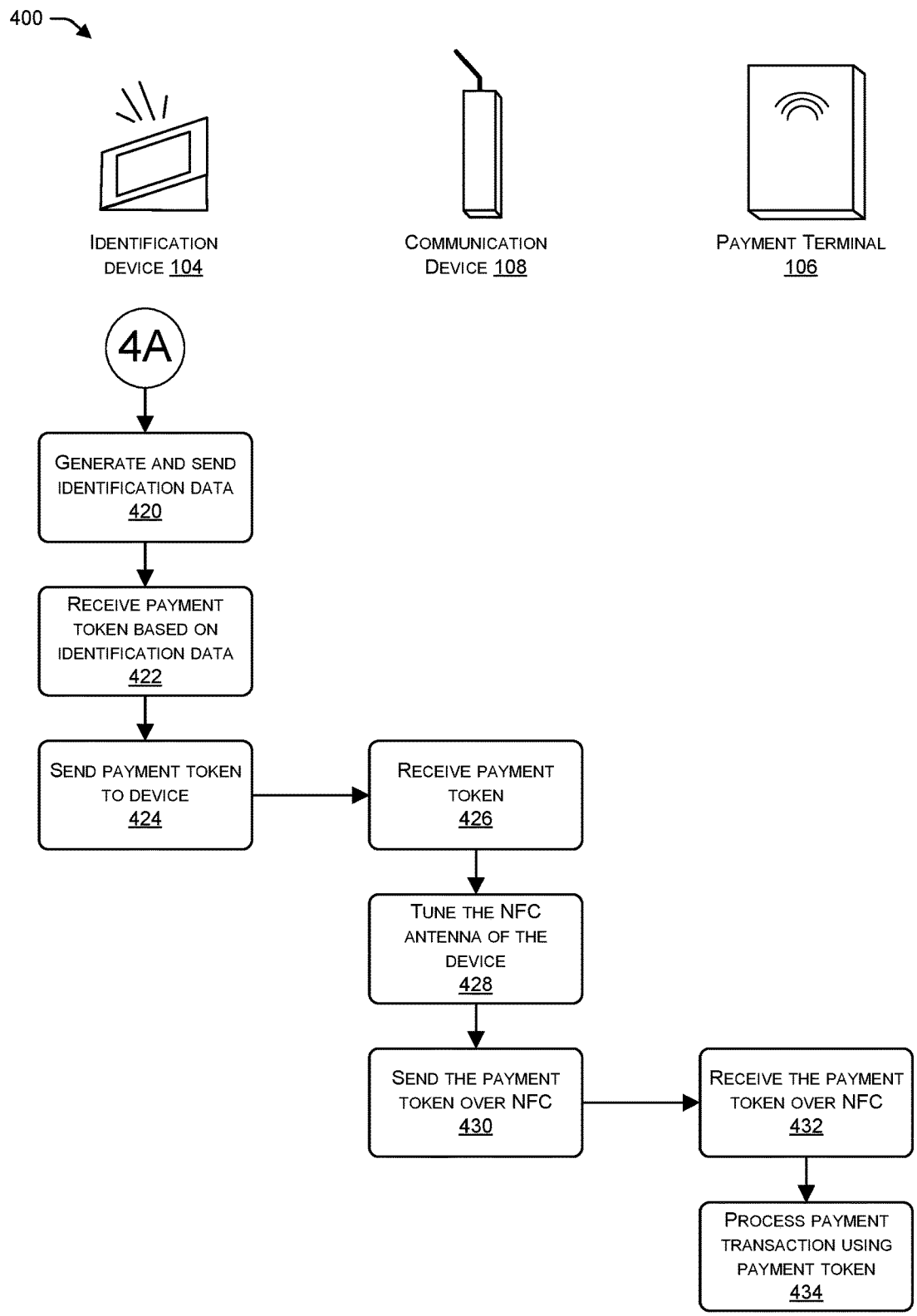

FIGS. 4A-B collectively illustrate a flow diagram of an example process 400 that the devices of FIG. 1 may implement for dynamically tuning and detuning an NFC antenna of a communication device. At an operation 402, the communication device 108 may the NFC antenna 112 of the communication device 108. For example, a microcontroller of the communication device 108 may configure the matching network or circuit coupled to the NFC antenna 112 to cause the NFC antenna to operate at the resonant frequency and amplitude of the NFC antenna 114 of the payment terminal 106.

At an operation 404, the payment terminal 106 receives an input to receive payment. For example, an associate at a facility or the user engaging in the transaction may operate the payment terminal to indicate that payment is to be received. At an operation 406, the payment terminal 106 may power on its NFC antenna 114, thus generating an NFC field.

Figure 5A:
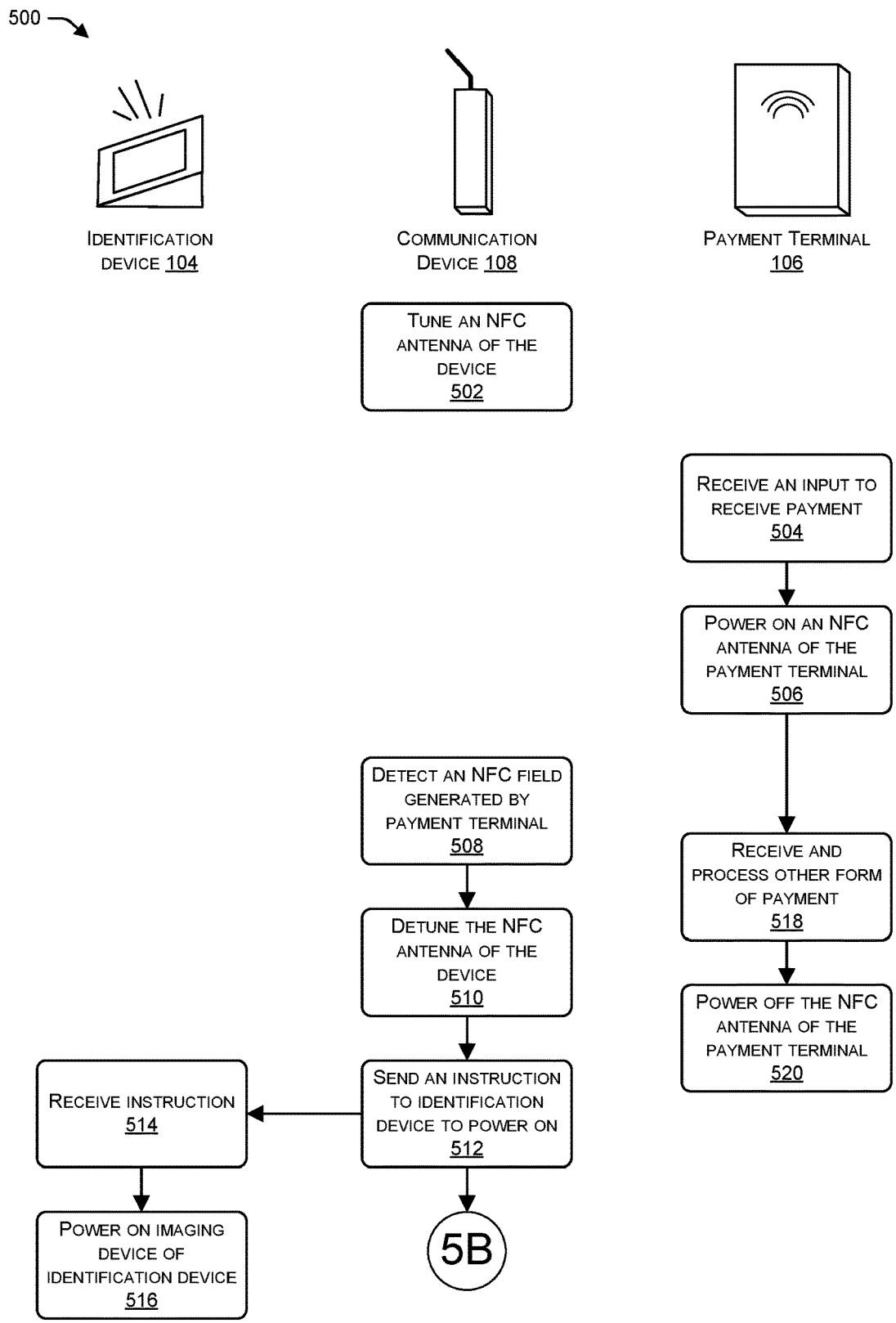
FIGS. 5A-B collectively illustrate a flow diagram of an example process that includes tuning the NFC antenna of the communication device to a resonant frequency of the NFC antenna of the payment terminal, detecting an NFC field generated by the payment terminal and, in response, detuning the NFC antenna of the communication and instructing the identification device power on the imaging device. The communication device may periodically tune its antenna to the resonant frequency and, in response to detecting an absence of the NFC field, may instruct the identification device to power off its imaging device.
Figure 5B:
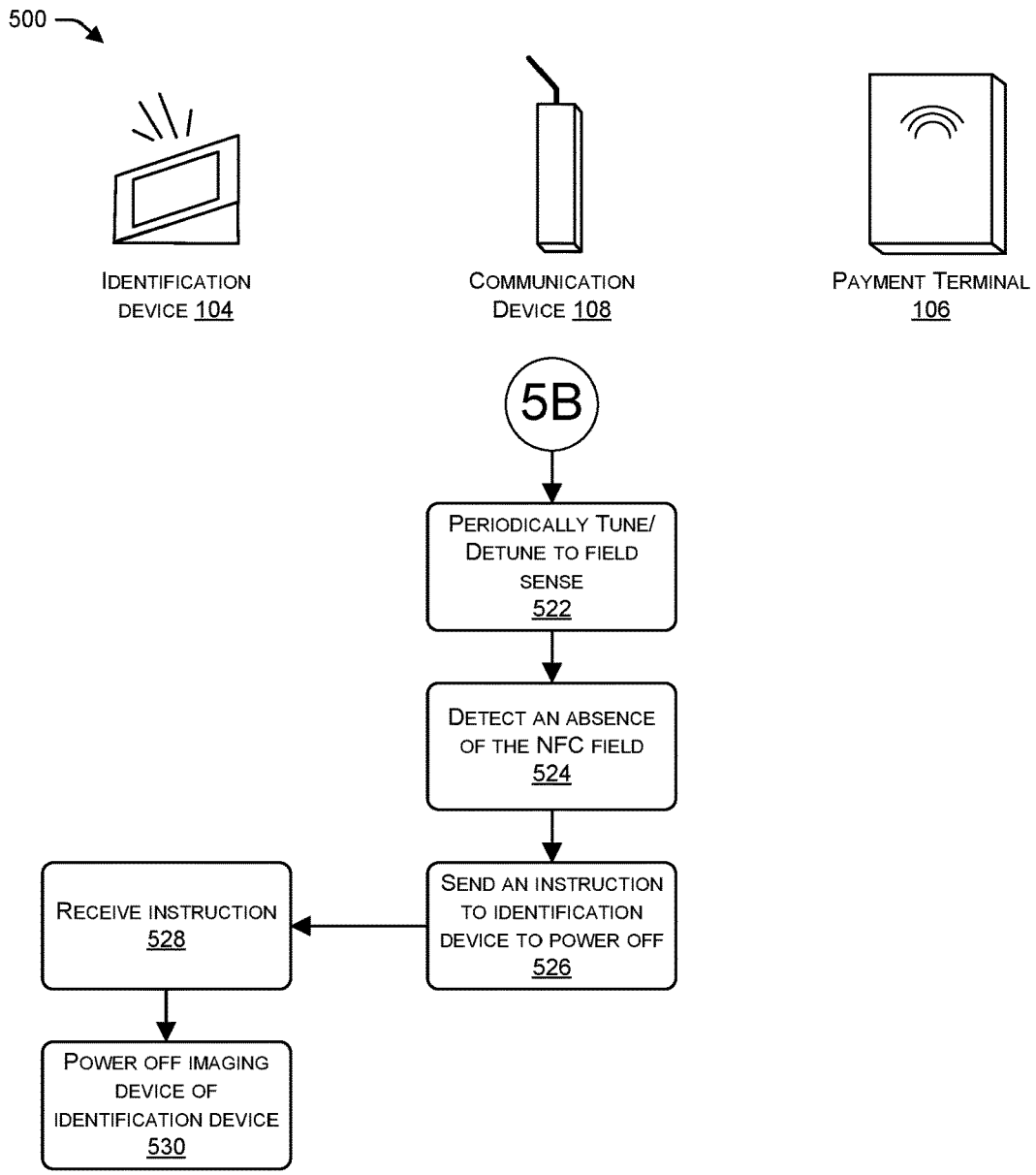

At an operation 408, the communication device 108 may use its NFC antenna 112 to detect the NFC field generated by the payment terminal 106. In response, at an operation 410, the communication device 108 may detune the NFC antenna 112 of the communication device 108. For example, the microcontroller of the communication device 108 may alter characteristic(s) of the matching network such that the NFC antenna 112 operates a frequency and/or amplitude that is significantly different than the resonant frequency and/or amplitude at which the NFC antenna 114 of the payment terminal operates. In addition, at an operation 412, the communication device 108 may send an instruction to the identification device 104 instructing one or more components of the identification device 104 to power on. The identification device 104 may receive the instruction at an operation 414 and, at an operation 416, may power on an imaging device and/or one or more other components of the device 104. Further, an operation 418 represents that the communication device 108 may periodically re-tune the NFC antenna 112 to attempt to detect the NFC field. If the communication device 112 detects the NFC field, the communication device 108 may again detune the NFC antenna 112 and set a timer to re-tune the antenna and check again after a predetermined amount of time. FIGS. 5A-B describe in detail the operation if the communication device 108 no longer detects the NFC field.

FIG. 4B continues the illustration of the process 400 and includes, at an operation 420, the identification device 104 generating identification data and sending this identification data to the servers 120. For example, upon the user 102 placing a palm of the user over the identification device 104, the identification device may generate image data of the palm of the user and may send this image data to the servers 120. At an operation 422, the identification device 104 receives a payment token that has been generated based on the image data generated by the identification device 104. At an operation 424, the identification device 104 sends the payment token (e.g., over on a non-NFC channel in some instances) to the communication device 108, which receives the payment token at an operation 426.

At an operation 428, the communication device 108 tunes the NFC antenna 112 of the communication device 108. For example, a microcontroller of the NFC communication chipset of the communication device 108 may alter characteristic(s) of the matching network such that the NFC antenna 112 of the communication device 108 operates at approximately 13.56 MHz and at approximate the same or similar amplitude as the NFC antenna 114 of the payment terminal 106 operates. At an operation 430, and after tuning the NFC antenna 112, the communication device 108 sends the payment token over NFC to the payment terminal 106. At an operation 432, meanwhile, the payment terminal 106 receives the payment token from the communication device 108 over NFC and, at an operation 434, processes a payment transaction using the received the payment token.

FIGS. 5A-B collectively illustrate a flow diagram of an example process 500 in instances where the user 102 does not pay for the transaction using the identification device 104. At an operation 502, the communication device 108 may the NFC antenna 112 of the communication device 108. For example, a microcontroller of the communication device 108 may configure the matching network or circuit coupled to the NFC antenna 112 to cause the NFC antenna to operate at the resonant frequency and amplitude of the NFC antenna 114 of the payment terminal 106.

At an operation 504, the payment terminal 106 receives an input to receive payment. For example, an associate at a facility or the user engaging in the transaction may operate the payment terminal to indicate that payment is to be received. At an operation 506, the payment terminal 106 may power on its NFC antenna 114, thus generating an NFC field.

At an operation 508, the communication device 108 may use its NFC antenna 112 to detect the NFC field generated by the payment terminal 106. In response, at an operation 510, the communication device 108 may detune the NFC antenna 112 of the communication device 108. For example, the microcontroller of the communication device 108 may alter characteristic(s) of the matching network such that the NFC antenna 112 operates a frequency and/or amplitude that is significantly different than the resonant frequency and/or amplitude at which the NFC antenna 114 of the payment terminal operates. In addition, at an operation 512, the communication device 108 may send an instruction to the identification device 104 instructing one or more components of the identification device 104 to power on. The identification device 104 may receive the instruction at an operation 514 and, at an operation 516, may power on an imaging device and/or one or more other components of the device 104.

At an operation 518, however, the payment terminal 106 receives and processes payment for the transaction using a form of payment other than a payment token generated in response to the identification device 104 generating image data. For example, the user 102 may have used a contactless credit card or other NFC-enabled credit card to pay for the transaction. After receiving payment, the payment terminal 106 powers off the NFC antenna 114 of the payment terminal 106 at an operation 320.

FIG. 5B continues the illustration of the process 500 and includes, at an operation 522, the communication device 108 periodically re-tuning the NFC antenna 112 to attempt to detect the NFC field. At an operation 524, the communication device 108 detects an absence of the NFC field, given that the payment terminal 106 has accepted a different form of payment and powered off the NFC antenna 114. Thus, at an operation 526, the communication device sends an instruction to the identification device 104 instructing the identification device 104 to power off one or more components. The identification device 104 receives the instruction at an operation 528 and, at an operation 530, powers off the image device of the identification device 104.

Figure 6:
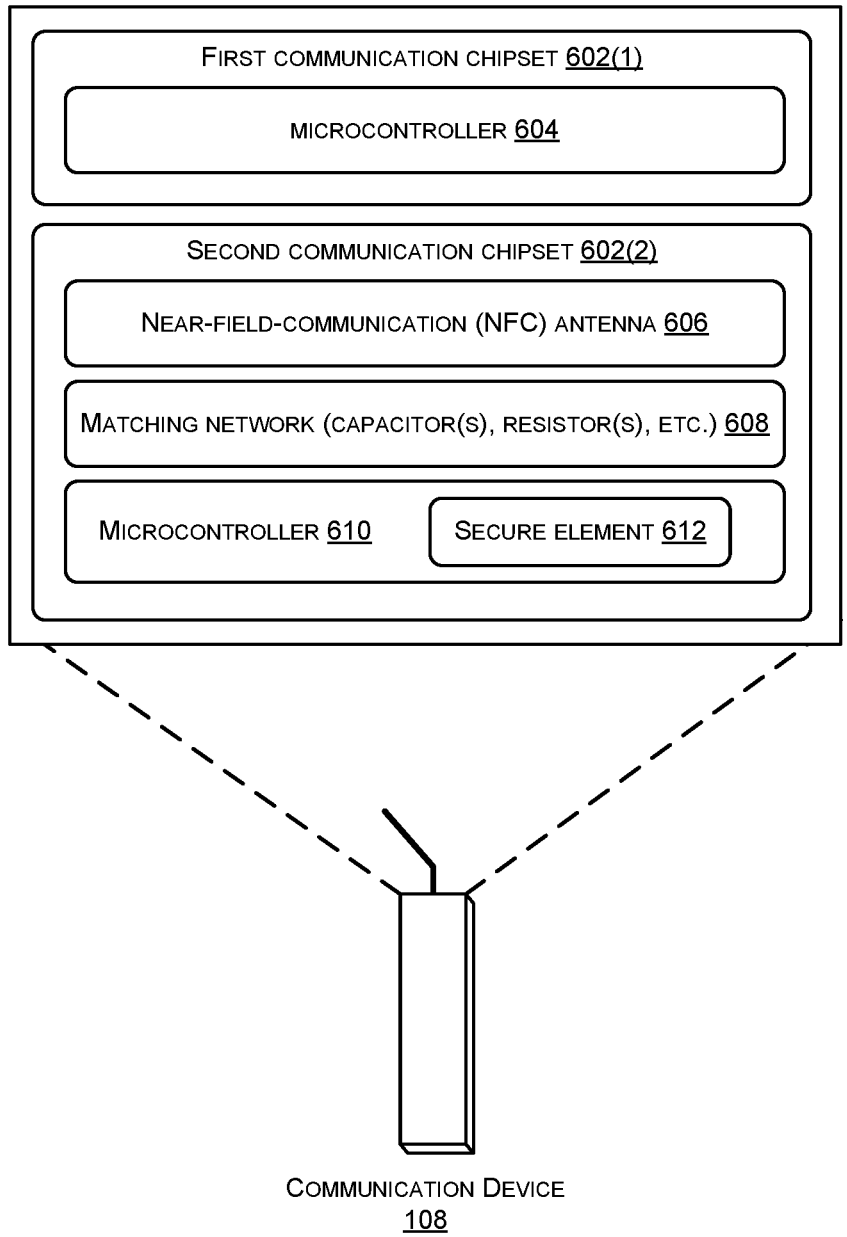
FIG. 6 illustrates example components of the communication device configured to interact with the identification device over a non-NFC protocol as well as with the payment terminal over NFC while avoiding interference with the NFC antenna of the payment terminal.

FIG. 6 illustrates example components of the communication device 108 configured to interact with the identification device 104 over a non-NFC protocol as well as with the payment terminal 106 over NFC while avoiding interference with the NFC antenna of the payment terminal. As illustrated, the communication device 108 may include a first communication chipset 602(1) and a second communication chipset 602(2). The first communication chipset 602(1) may, in some instances, enable the communication device to communicate via one or more non-NFC communication protocols, such as over USB, Bluetooth, Zigbee, WiFi Direct, and/or the like. As illustrated, the first communication chipset 602(1) may include a microcontroller 604 that includes logic for communicating with other devices, such as the identification device. For example, the microcontroller 604 may generate and send the messages described above and below for instructing the identification device to power on and/or off one or more components.

The second communication chipset 602(2), meanwhile, may enable the communication device to communicate with one or more devices, such as the payment terminal 106 over NFC. As illustrated, the second communication chipset 602(2) may include an NFC antenna 606 (which may correspond to the NFC antenna 112 discussed above), a matching network 608 (e.g., capacitors, resistors, etc.) coupled to the NFC antenna 606, and a microcontroller 610. The microcontroller 610 and/or the microcontroller 604 may include logic that is configured to determine when to tune and/or de-tune the NFC antenna 606 and may logic configured to change the characteristics of the matching network 608 accordingly. As will be appreciated, changing the characteristics of the matching network 608 may include operating one or more switches in the matching network to alter which capacitors and/or resistors couple to the NFC antenna 606 at a given time, thus changing the frequency and/or amplitude of the operation of the NFC antenna 606. In some instances, the microcontrollers 604 and/or 610 are configured to perform some or all of the of the operations described with reference to processes 200, 300, 400, 500, 700, and/or 800.

FIG. 6 further illustrates that the microcontroller 610 may include a secure element 612, which may be configured to receive and decrypt the payment token received from the identification device 104. As used here, when the communication device 108 receives a payment token and sends the token along to the payment terminal 106 over NFC (or the like), this may include the secure element 612 performing one or more decryption techniques to enable the payment terminal to read and process the token for payment.

While FIG. 6 illustrates that the communication device 108 may include two chipsets in some instances, in other instances the communication device 108 may include a single chipset including the components and may be configured to perform each of the operations described above with respect to chipsets 602(1) and 602(2). That is, the single chipset may include a microcontroller configured to cause communication between the communication device 108 and the identification device 104 over USB and between the communication device 108 and the payment terminal 106 over NFC.

Figure 7:
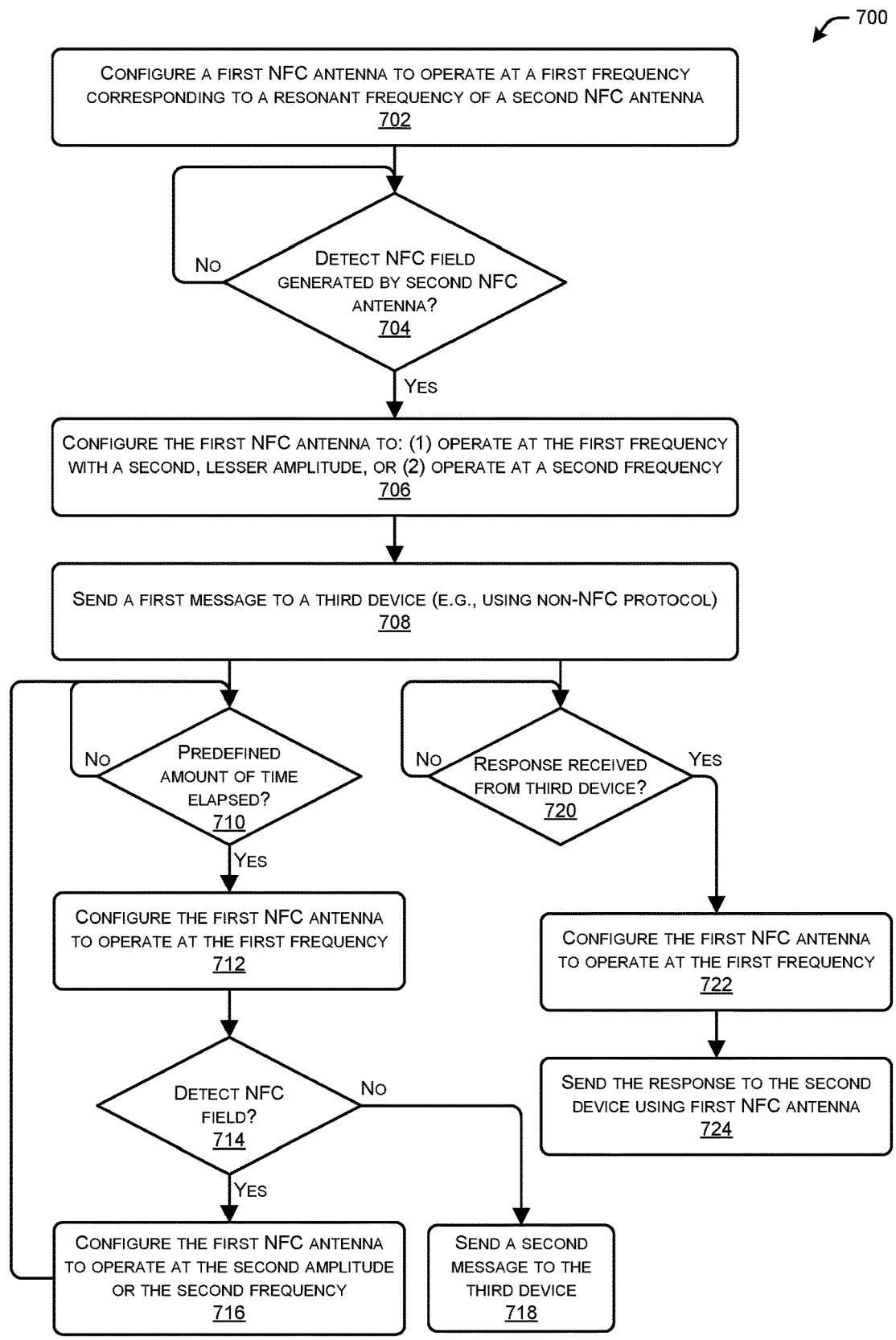
FIG. 7 illustrates a flow diagram of an example process that logic (e.g., one or more microcontrollers) of the communication device may implement for interacting with the identification device over the non-NFC protocol as well as with the payment terminal over NFC while avoiding interference with the NFC antenna of the payment terminal.

FIG. 7 illustrates a flow diagram of an example process 700 that logic (e.g., one or more microcontrollers) of the communication device may implement for interacting with the identification device over the non-NFC protocol as well as with the payment terminal over NFC while avoiding interference with the NFC antenna of the payment terminal. An operation 702 represents configuring a first NFC antenna of a first device to operate at a first frequency, the first frequency corresponding to a resonant frequency of a second NFC antenna of a second device. For example, this may include the microcontroller 610 described above configuring a matching circuit of the first NFC antenna to operate at the first frequency. An operation 704, meanwhile, represents determining whether an NFC field generated by the second NFC antenna has been detected (e.g., by the first device using the first NFC antenna). If not, the process 700 continues to attempt to detect the NFC field.

If the NFC field is detected, meanwhile, an operation 706 represents configuring the first NFC antenna to at least one of: (1) operate at the first frequency with a second amplitude that is less than a first amplitude at which the second NFC antenna operates, or (2) operate at a second frequency that is different than the first frequency. In addition, an operation 708 represents sending, at least partly in response to detecting the NFC field, a message to a third device using a communication protocol other than NFC.

In some instances, operations 710-718 may be performed wholly or partly in parallel with operations 720-724. The operation 710 represents determining whether a predefined amount of time has elapsed since "detuning" the first NFC antenna at the operation 706 or since one or more other events. For example, after detuning the first NFC antenna, the microcontroller 610 may set a timer and may determine when the timer elapses. Upon determining that the predefined amount of time has elapsed, an operation 712 represents configuring the first NFC antenna to operate at the first frequency and at or near the amplitude at which the second NFC antenna operates. That is, the operation 712 may represent tuning the first NFC antenna to operate at the resonant frequency associated with the second NFC antenna. An operation 714 represents detecting whether the NFC field is still present. If so, then then an operation 716 represents again configuring the first NFC antenna to operate at the second frequency or at the second amplitude. That is, the operation 716 may again detune the first NFC antenna. Further, the process may return to the determination of whether the predefined amount of time has elapsed at the operation 710. For example, the microcontroller 610 may reset the time for the predefined amount of time.

If, however, the operation 714 detects, using the first NFC antenna, an absence of the NFC field generated by the second device using the second NFC antenna, then an operation 718 may send a second message to the third device using the communication protocol other than NFC. For example, the microcontroller 604 may send a message to the third device instructing the third device to power off one or more components, such as an imaging device, a microphone, and/or the like.

An operation 720, meanwhile, represents determining whether a response to the first message has been received from the third device. If not, then operation 720 continues to make this determination. If a response is received, however, then an operation 722 configures the first NFC antenna to operate at the first frequency with the first amplitude. That is, the microcontroller 610 may cause the first NFC antenna to operate the resonant frequency of the second NFC antenna. Further, an operation 724 represents sending the response to the second device using the first NFC antenna. For example, the microcontroller 610 may cause the response to be sent to the second device via the first, tuned NFC antenna. In some instances, this response may comprise a payment token for satisfying a cost of a transaction. It is also to be appreciated that receiving a response for the third device may cause the operations 710-718 to cease.

Figure 8:
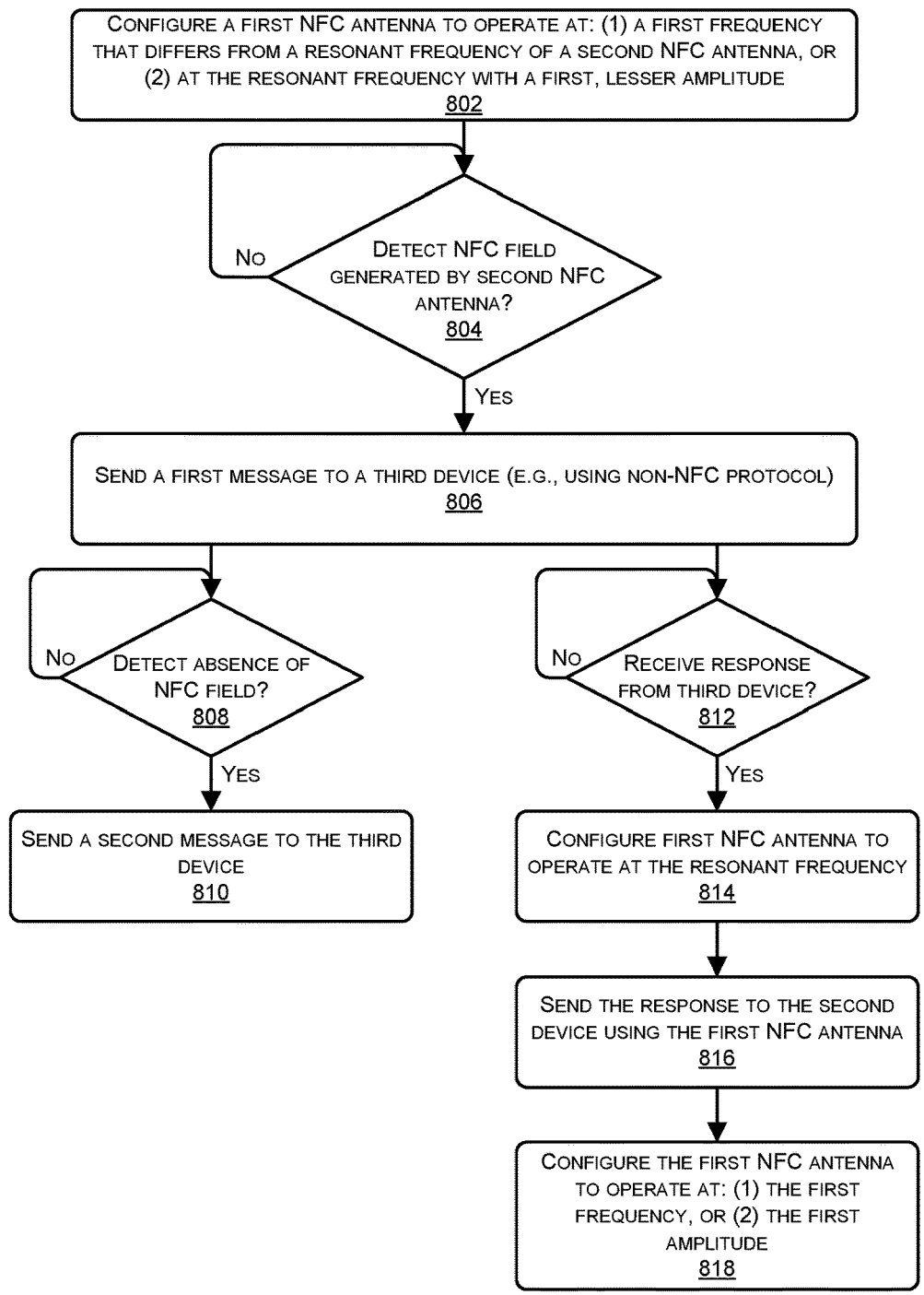
FIG. 8 illustrates a flow diagram of another example process that logic (e.g., one or more microcontrollers) of the communication device may implement for interacting with the identification device over the non-NFC protocol as well as with the payment terminal over NFC while avoiding interference with the NFC antenna of the payment terminal.

FIG. 8 illustrates a flow diagram of another example process 800 that logic (e.g., one or more microcontrollers) of the communication device may implement for interacting with the identification device over the non-NFC protocol as well as with the payment terminal over NFC while avoiding interference with the NFC antenna of the payment terminal. An operation 802 represents configuring a first NFC antenna of a first device to at least one of: (1) operate at a first frequency that differs from a resonant frequency of a second NFC antenna of a second device, or (2) operate at or near the resonant frequency with a first amplitude that is less than a second amplitude at which the second NFC antenna operates. In some instances, the microcontroller 610 performs the operation 802 as well as an operation 804, which represents determining whether an NFC field generated by the second NFC antenna has been detected. If so, then an operation 806 represents sending a first message to a third device at least partly in response to detecting the NFC field generated by the second device using the second NFC antenna. In some instances, the microcontroller 610 sends this first message instructing the third device to power on one or more components.

In some instances, operations 808-810 and operations 812-818 may operate wholly or partly in parallel. The operation 808 represents determining whether an absence in the NFC field has been detected (e.g., by the microcontroller 610 using the NFC antenna 606). If so, then an operation 810 represents sending a second message to the third device. This may comprise the microcontroller 610 sending a message to the third device instructing the third device to power off the one or more components.

The operation 812, meanwhile, represents determining whether a response has been received from the third device. If so, then an operation 814 represents configuring the first NFC antenna to operate at or near the resonant frequency with a third amplitude that is greater than the second amplitude. That is, the microcontroller 610 may cause the first NFC antenna to operate at or near the resonant frequency with at or near the same amplitude at which the second NFC antenna operates. At an operation 816, the microcontroller 610 may send the response to the second device using the first, tuned NFC antenna. After doing so, at an operation 818, the microcontroller 610 may again configure the first NFC antenna to operate at least one of: (1) at the first frequency, or (2) at the first amplitude. That is, the microcontroller 610 may again detune the first NFC antenna. It is also to be appreciated that receiving a response for the third device may cause the operations 810-812 to cease.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a first device that includes a first near-field-communication (NFC) antenna, the method comprising:
    configuring the first NFC antenna to operate at a first frequency that differs from a resonant frequency of a second NFC antenna of a second device;
    detecting, using the first NFC antenna, an NFC field generated by the second device using the second NFC antenna; and configuring the first NFC antenna to operate at or near the resonant frequency with a first amplitude that is greater than a second amplitude at which the second NFC antenna operates.

2. The method as recited in claim 1, further comprising: sending a message to a third device at least partly in response to detecting the NFC field generated by the second device using the second NFC antenna.

3. The method as recited in claim 2, wherein the sending the message comprises sending the message to the third device using a communication protocol other than NFC.

4. The method as recited in claim 2, wherein the sending the message comprises sending the message to the third device instructing the third device to power on at least one component of the third device.

5. The method as recited in claim 2, wherein the third device is configured to generate identification data for identifying a user, and the sending the message comprises sending the message to the third device instructing the third device to power on an imaging device of the third device to generate the identification data.

6. The method as recited in claim 2, further comprising:
receiving a response from the third device; and
sending the response to the second device using the first NFC antenna;
and wherein the configuring the first NFC antenna to operate at or near the resonant frequency with the first amplitude comprises configuring the first NFC antenna to operate at or near the resonant frequency with the first amplitude at least partly in response to the receiving of the response from the third device.

7. The method as recited in claim 6, further comprising:
configuring, after sending the response to the second device, the first NFC antenna to operate at the first frequency that differs from the resonant frequency.

8. The method as recited in claim 6, wherein the second device comprises a payment terminal, the response comprises payment information, and the sending the response comprises sending the payment information to the payment terminal using the first NFC antenna, the payment information for satisfying a cost of a transaction.

9. A method implemented by a first device that includes a first near-field-communication (NFC) antenna, the method comprising:
configuring the first NFC antenna to operate at or near a resonant frequency of a second NFC antenna of a second device with a first amplitude that is less than a second amplitude at which the second NFC antenna operates;
detecting, using the first NFC antenna, an NFC field generated by the second device using the second NFC antenna; and
configuring the first NFC antenna to operate at or near the resonant frequency with a third amplitude that is greater than the second amplitude.

10. The method as recited in claim 9, further comprising:
sending a message to a third device at least partly in response to detecting the NFC field generated by the second device using the second NFC antenna.

11. The method as recited in claim 10, wherein the sending the message comprises sending the message to the third device using a communication protocol other than NFC.

12. The method as recited in claim 10, wherein the sending the message comprises sending the message to the third device instructing the third device to power on at least one component of the third device.

13. The method as recited in claim 10, wherein the third device is configured to generate identification data for identifying a user, and the sending the message comprises sending the message to the third device instructing the third device to power on an imaging device of the third device to generate the identification data.

14. The method as recited in claim 10, further comprising:
receiving a response from the third device; and
sending the response to the second device using the first NFC antenna;
and wherein the configuring the first NFC antenna to operate at or near the resonant frequency with the third amplitude comprises configuring the first NFC antenna to operate at or near the resonant frequency with the third amplitude at least partly in response to the receiving of the response from the third device.

15. The method as recited in claim 14, further comprising:
configuring, after sending the response to the second device, the first NFC antenna to operate at or near the resonant frequency with the first amplitude.

16. The method as recited in claim 14, wherein the second device comprises a payment terminal, the response comprises payment information, and the sending the response comprises sending the payment information to the payment terminal using the first NFC antenna, the payment information for satisfying a cost of a transaction.

17. A method implemented by a first device that includes a first near-field-communication (NFC) antenna, the method comprising:
configuring the first NFC antenna to at least one of: (1) operate at a first frequency that differs from a resonant frequency of a second NFC antenna of a second device, or (2) operate at or near the resonant frequency with a first amplitude that is less than a second amplitude at which the second NFC antenna operates;
detecting, using the first NFC antenna, an NFC field generated by the second device using the second NFC antenna; and
configuring the first NFC antenna to operate at or near the resonant frequency with a third amplitude that is greater than the second amplitude.

18. The method as recited in claim 17, further comprising:
sending a message to a third device at least partly in response to detecting the NFC field generated by the second device using the second NFC antenna.

19. The method as recited in claim 18, wherein the sending the message comprises sending the message to the third device using a communication protocol other than NFC.

20. The method as recited in claim 18, wherein the sending the message comprises sending the message to the third device instructing the third device to power on at least one component of the third device.

* * * * *